(12) United States Patent
Hunter

(10) Patent No.: US 10,537,951 B2
(45) Date of Patent: Jan. 21, 2020

(54) BAND SAW BLADE FOR CUTTING STRUCTURAL WORKPIECES

(71) Applicant: BLACK & DECKER INC., New Britain, CT (US)

(72) Inventor: Matthew J. Hunter, Hatfield, MA (US)

(73) Assignee: BLACK & DECKER INC., New Britain, CT (US)

( * ) Notice: Subject to any disclaimer, the term of this patent is extended or adjusted under 35 U.S.C. 154(b) by 167 days.

(21) Appl. No.: 15/678,851

(22) Filed: Aug. 16, 2017

(65) Prior Publication Data

US 2019/0054553 A1 Feb. 21, 2019

(51) Int. Cl.
  *B23D 61/12* (2006.01)
  *B27B 33/02* (2006.01)

(52) U.S. Cl.
  CPC ......... *B23D 61/121* (2013.01); *B23D 61/123* (2013.01); *B27B 33/02* (2013.01); *Y10T 83/9317* (2015.04); *Y10T 83/9319* (2015.04)

(58) Field of Classification Search
  CPC ............... B23D 61/121; B23D 61/123; Y10T 83/9319–9367; Y10T 83/9317; B27B 33/02; B27B 33/04; B27B 33/12
  USPC .......................................... 83/661, 835–855
  See application file for complete search history.

(56) References Cited

U.S. PATENT DOCUMENTS

| 521,343 A | 6/1894 | Hazard |
| 603,128 A | 4/1898 | Clemson |
| 820,969 A | 5/1906 | Grelck |
| 1,181,529 A | 5/1916 | Hutton |
| 1,381,930 A | 6/1921 | Henry |
| 1,453,335 A | 5/1923 | Herbert |

(Continued)

FOREIGN PATENT DOCUMENTS

| CH | 691438 A5 | 7/2001 |
| CN | 2310656 Y | 3/1999 |

(Continued)

OTHER PUBLICATIONS

Chariot, David—Extended European Search Report re related European Patent Application No. 18181624.0-1019—Dec. 17, 2018—9 pages.

(Continued)

*Primary Examiner* — Laura M Lee
(74) *Attorney, Agent, or Firm* — Scott B. Markow

(57) ABSTRACT

A band saw blade may include a cutting edge defined by a number of teeth. Each tooth may include a tip, a rake face, a primary clearance surface defining a primary relief angle, a secondary clearance surface defining a secondary relief angle greater than the primary relief angle, a tertiary clearance surface defining a tertiary relief angle greater than the secondary relief angle, a first curvilinear protrusion formed between the secondary clearance surface and the tertiary clearance surface, a gullet surface, and a second curvilinear protrusion formed between the rake face and the gullet surface. The teeth may be spaced at varying pitch distances such that a difference between a minimum teeth per inch (TPI) based on a maximum pitch distance and a maximum TPI based on a minimum pitch distance is equal to or greater than 1, and may define a kerf width between 0.115 inches to 0.140 inches.

20 Claims, 12 Drawing Sheets

(56) References Cited

U.S. PATENT DOCUMENTS

| | | |
|---|---|---|
| 1,718,441 A | 6/1929 | Lovell et al. |
| 2,071,618 A | 2/1937 | Ferrari et al. |
| 2,126,382 A | 8/1938 | Goff et al. |
| 2,227,864 A | 1/1941 | Ronan |
| 2,241,703 A | 5/1941 | Gommel |
| 2,270,776 A | 1/1942 | Thornton |
| 2,394,035 A | 2/1946 | Blum |
| 2,534,424 A | 12/1950 | Ernest |
| 2,568,870 A | 9/1951 | Ronan |
| 2,593,760 A | 4/1952 | Guy |
| 2,624,381 A | 1/1953 | Von Der Werth |
| 2,635,327 A | 4/1953 | Enlow |
| 2,637,355 A | 5/1953 | Chapin |
| 2,682,098 A | 6/1954 | Wilcox |
| 2,714,317 A | 8/1955 | Drake |
| 2,722,953 A | 11/1955 | Lee |
| 3,072,164 A | 1/1963 | Ramirez et al. |
| 3,171,457 A | 3/1965 | Brown |
| 3,292,674 A | 12/1966 | Arthur |
| 3,309,756 A | 3/1967 | Segal |
| 3,576,061 A | 4/1971 | Pahlitzsch |
| 3,576,200 A | 4/1971 | Elmes |
| 3,651,841 A | 3/1972 | Ohlsson |
| 3,661,037 A | 5/1972 | Athanasoulas |
| 3,712,348 A | 1/1973 | Kulik et al. |
| 3,736,828 A | 6/1973 | Funakubo |
| 3,866,504 A | 2/1975 | Claesson et al. |
| 3,990,334 A | 11/1976 | Mellgren |
| 4,001,937 A | 1/1977 | Stelljes et al. |
| 4,031,793 A | 6/1977 | Miaskoff |
| 4,043,404 A | 8/1977 | Sorlie et al. |
| 4,150,215 A | 4/1979 | Kelley |
| 4,179,967 A | 12/1979 | Clark |
| 4,232,578 A | 11/1980 | Stellinger et al. |
| 4,292,871 A | 10/1981 | Neumeyer et al. |
| 4,311,075 A | 1/1982 | Sundstrom |
| RE31,433 E | 11/1983 | Clark |
| 4,557,172 A | 12/1985 | Yoneda |
| 4,568,416 A | 2/1986 | Okui et al. |
| 4,587,876 A | 5/1986 | Erhardt |
| 4,603,613 A | 8/1986 | Wilson |
| 4,658,689 A | 4/1987 | Yakich |
| 4,688,458 A * | 8/1987 | Krilov .................. B23D 61/12 83/661 |
| 4,727,788 A | 3/1988 | Yoshida et al. |
| 4,784,033 A | 11/1988 | Hayden et al. |
| 4,784,034 A | 11/1988 | Stones et al. |
| 4,798,001 A | 1/1989 | Grossmann et al. |
| 4,802,396 A | 2/1989 | Kuklinski |
| 4,813,324 A | 3/1989 | Yoshida et al. |
| 4,827,822 A | 5/1989 | Yoshida et al. |
| 4,867,026 A | 9/1989 | Henning et al. |
| 4,913,022 A | 4/1990 | Kuklinski |
| 4,958,546 A | 9/1990 | Yoshida et al. |
| 5,016,356 A | 5/1991 | Trench |
| 5,018,421 A | 5/1991 | Lucki et al. |
| 5,094,135 A | 3/1992 | Nakahara et al. |
| 5,331,876 A | 7/1994 | Hayden, Sr. |
| 5,340,129 A | 8/1994 | Wright |
| 5,410,935 A | 5/1995 | Holston et al. |
| 5,425,296 A | 6/1995 | Kullmann et al. |
| 5,433,457 A | 7/1995 | Wright |
| 5,440,960 A | 8/1995 | Sadahiro |
| 5,477,763 A | 12/1995 | Kullman |
| 5,501,129 A | 3/1996 | Armstrong et al. |
| 5,603,252 A | 2/1997 | Hayden, Sr. |
| 5,606,900 A | 3/1997 | Stoddard |
| 5,642,766 A | 7/1997 | MacCauley, III |
| 5,697,280 A | 12/1997 | Armstrong et al. |
| 5,803,677 A | 9/1998 | Brutscher et al. |
| 5,803,678 A | 9/1998 | Korb et al. |
| 5,826,477 A | 10/1998 | Brewer, Sr. |
| 5,832,803 A | 11/1998 | Hayden, Sr. |
| 5,848,473 A | 12/1998 | Brandenburg, Jr. |
| 5,868,058 A | 2/1999 | Senegas |
| 6,003,422 A | 12/1999 | Holston |
| D427,865 S | 7/2000 | Mills, Jr. |
| 6,119,571 A | 9/2000 | Hayden, Sr. |
| 6,145,426 A | 11/2000 | Ward et al. |
| 6,152,815 A | 11/2000 | Meerdink et al. |
| 6,158,324 A | 12/2000 | Kullmann et al. |
| 6,167,792 B1 | 1/2001 | Korb et al. |
| 6,178,646 B1 | 1/2001 | Schnell et al. |
| D439,666 S | 3/2001 | Ventura |
| 6,220,139 B1 | 4/2001 | Kobayashi et al. |
| 6,220,140 B1 | 4/2001 | Hellebergh |
| 6,230,411 B1 | 5/2001 | Wall et al. |
| 6,244,152 B1 | 6/2001 | Nicolantonio |
| 6,257,226 B1 | 7/2001 | Hayden, Sr. |
| 6,269,722 B1 | 8/2001 | Hellbergh |
| 6,276,248 B1 | 8/2001 | Cranna |
| 6,276,249 B1 | 8/2001 | Handschuh et al. |
| 6,314,854 B1 | 11/2001 | Fritz et al. |
| 6,357,124 B1 | 3/2002 | Wall et al. |
| 6,363,827 B1 | 4/2002 | Osing et al. |
| 6,439,094 B1 | 8/2002 | Yoneda et al. |
| 6,505,537 B1 | 1/2003 | Voge |
| 6,520,722 B2 | 2/2003 | Hopper et al. |
| 6,532,852 B1 | 3/2003 | Tsujimoto et al. |
| 6,588,992 B2 | 7/2003 | Rudolph |
| 6,598,509 B2 | 7/2003 | Cook et al. |
| 6,601,492 B1 | 8/2003 | Schusheim |
| 6,601,495 B2 * | 8/2003 | Cranna .................. B23D 61/121 83/661 |
| 6,681,674 B2 | 1/2004 | Hakansson et al. |
| 6,834,573 B1 | 12/2004 | Nakahara |
| 6,931,975 B2 | 8/2005 | Haughton et al. |
| 7,017,465 B2 | 3/2006 | Dion et al. |
| 7,036,415 B2 | 5/2006 | Tsujimoto |
| 7,036,417 B2 | 5/2006 | Alton |
| 7,036,425 B2 | 5/2006 | Chang |
| 7,077,041 B2 | 7/2006 | Kunkel et al. |
| 7,121,180 B2 | 10/2006 | Shimofurutani |
| 7,127,979 B2 | 10/2006 | Kocher et al. |
| 7,131,365 B2 | 11/2006 | Hall et al. |
| 7,163,366 B2 | 1/2007 | Chen |
| 7,174,823 B2 * | 2/2007 | Cranna .................. B23D 61/121 83/835 |
| 7,178,441 B2 | 2/2007 | Hellbergh |
| 7,216,942 B2 | 5/2007 | Yasutake et al. |
| 7,225,714 B2 | 6/2007 | Rompel et al. |
| D555,444 S | 11/2007 | Ammann |
| 7,334,511 B2 | 2/2008 | Hesselberg et al. |
| D575,808 S | 8/2008 | Zeiler et al. |
| 7,451,678 B2 | 11/2008 | Dion et al. |
| 7,488,146 B2 | 2/2009 | Brunson |
| 7,517,179 B2 | 4/2009 | Miller et al. |
| 7,559,726 B1 | 7/2009 | Beach |
| 7,568,416 B2 | 8/2009 | Tsujimoto |
| 7,578,672 B2 | 8/2009 | Sheikh et al. |
| D605,372 S | 12/2009 | Wilkinson |
| 7,625,160 B2 | 12/2009 | Zeiler et al. |
| 7,658,136 B2 | 2/2010 | Rompel et al. |
| 7,661,347 B2 | 2/2010 | Nagano et al. |
| 7,832,320 B2 | 11/2010 | Earle et al. |
| 7,913,601 B2 | 3/2011 | Petts et al. |
| 8,210,081 B2 | 7/2012 | Elliston et al. |
| 8,621,972 B2 | 1/2014 | Nagano |
| 8,695,470 B2 | 4/2014 | Kullmann et al. |
| 8,714,059 B2 | 5/2014 | Cranna |
| 8,826,790 B2 | 9/2014 | Mabon et al. |
| 9,248,518 B2 | 2/2016 | Elliston et al. |
| 9,375,796 B2 | 6/2016 | Elliston et al. |
| 9,731,365 B2 * | 8/2017 | Cranna .................. B23D 61/121 |
| 10,166,612 B2 * | 1/2019 | Beach .................. B23B 51/0406 |
| 2001/0004860 A1 | 6/2001 | Kullmann et al. |
| 2001/0015120 A1 | 8/2001 | Hickey et al. |
| 2002/0029679 A1 | 3/2002 | Cranna |
| 2002/0050196 A1 | 5/2002 | Fluhrer et al. |
| 2002/0124707 A1 | 9/2002 | Izard |
| 2003/0010179 A1 | 1/2003 | McLuen |
| 2003/0051593 A1 | 3/2003 | Kocher et al. |
| 2003/0116006 A1 | 6/2003 | Graf |
| 2003/0121391 A1 | 7/2003 | Knebel |

(56) References Cited

U.S. PATENT DOCUMENTS

| | | | |
|---|---|---|---|
| 2004/0035282 A1 | 2/2004 | Tsujimoto | |
| 2004/0050234 A1 | 3/2004 | Fluhrer et al. | |
| 2004/0158996 A1 | 8/2004 | McIntosh | |
| 2004/0182218 A1 | 9/2004 | Chao | |
| 2004/0214922 A1 | 10/2004 | Aketa et al. | |
| 2004/0255740 A1 | 12/2004 | Troyer | |
| 2004/0255749 A1 | 12/2004 | Hayden | |
| 2005/0028664 A1 | 2/2005 | Terada et al. | |
| 2005/0056135 A1 | 3/2005 | Hall et al. | |
| 2005/0188550 A1 | 9/2005 | Uehlein-Proctor et al. | |
| 2005/0211046 A1 | 9/2005 | Thomas et al. | |
| 2005/0257660 A1 | 11/2005 | Hayden | |
| 2006/0065098 A1 | 3/2006 | Cranna | |
| 2006/0130628 A1 | 6/2006 | Rompel et al. | |
| 2006/0130629 A1 | 6/2006 | Rompel et al. | |
| 2006/0162526 A1 | 7/2006 | Nagano et al. | |
| 2007/0193427 A1 | 8/2007 | Hayden | |
| 2007/0199416 A1 | 8/2007 | Cook et al. | |
| 2007/0214922 A1 | 9/2007 | Cook et al. | |
| 2007/0251372 A1 | 11/2007 | Petts et al. | |
| 2008/0121079 A1 | 5/2008 | Hashimoto et al. | |
| 2008/0121084 A1 | 5/2008 | Vogel et al. | |
| 2008/0271327 A1 | 11/2008 | Glynn | |
| 2008/0307936 A1 | 12/2008 | Elliston et al. | |
| 2009/0007437 A1 | 1/2009 | Tokiwa | |
| 2009/0145280 A1 | 6/2009 | Bucks et al. | |
| 2009/0274923 A1 | 11/2009 | Hall et al. | |
| 2009/0307936 A1 | 12/2009 | Rolsten | |
| 2011/0265627 A1 | 11/2011 | Kwanka | |
| 2011/0271815 A1 | 11/2011 | Elliston et al. | |
| 2012/0000338 A1 | 1/2012 | Elliston et al. | |
| 2012/0017742 A1 | 1/2012 | Balint | |
| 2012/0055313 A1 | 3/2012 | Nagano | |
| 2012/0093599 A1 | 4/2012 | Evatt et al. | |
| 2012/0230788 A1 | 9/2012 | Bozic et al. | |
| 2013/0133500 A1 | 5/2013 | Horiguchi et al. | |
| 2013/0149059 A1* | 6/2013 | Cranna | B23D 61/121 408/204 |
| 2013/0180375 A1 | 7/2013 | Rearick et al. | |
| 2013/0032014 A1 | 9/2013 | Bozic et al. | |
| 2014/0020531 A1 | 1/2014 | Tsujimoto | |
| 2014/0023446 A1 | 1/2014 | Piller et al. | |
| 2014/0023447 A1* | 1/2014 | Thom | B23B 51/0406 408/204 |
| 2014/0069246 A1 | 3/2014 | Moehringer | |
| 2015/0027282 A1 | 1/2015 | Fowler et al. | |
| 2015/0151372 A1 | 6/2015 | Tsujimoto et al. | |
| 2017/0355030 A1* | 12/2017 | Fowler | B23D 61/121 |
| 2019/0054553 A1* | 2/2019 | Hunter | B23D 61/121 |

FOREIGN PATENT DOCUMENTS

| | | | |
|---|---|---|---|
| CN | 203696058 | U | 7/2014 |
| CN | 203887281 | U | 10/2014 |
| DE | 19501019 | A1 | 7/1996 |
| DE | 10030168 | A1 | 1/2001 |
| DE | 10253711 | A1 | 6/2004 |
| DE | 102006015278 | A1 | 10/2007 |
| EP | 1586401 | A1 | 10/2005 |
| EP | 1785210 | A1 | 5/2007 |
| EP | 3162484 | A1 | 5/2017 |
| ES | 2352223 | T3 | 2/2011 |
| FR | 2729321 | A1 | 7/1996 |
| GB | 2354480 | B | 10/2003 |
| JP | S52-26679 | A | 2/1977 |
| JP | S63-256309 | A | 10/1988 |
| JP | S64-11708 | A | 1/1989 |
| JP | H06-716 | A | 1/1994 |
| JP | H06-717 | A | 1/1994 |
| JP | 2000-343325 | A | 12/2000 |
| JP | 2001-009634 | A | 1/2001 |
| JP | 2001-062629 | A | 3/2001 |
| JP | 2004-504170 | A | 2/2004 |
| JP | 2006150486 | A | 6/2006 |
| JP | 2006-326823 | A | 12/2006 |
| JP | 2007-290112 | A | 11/2007 |
| JP | 2010046736 | A2 | 4/2010 |
| KR | 10-0625218 | B1 | 9/2006 |
| WO | 1999/032251 | A1 | 7/1999 |
| WO | 02/06020 | A1 | 1/2002 |
| WO | 2002/006020 | A1 | 1/2002 |
| WO | 2005/087421 | A1 | 9/2005 |
| WO | 2006/042929 | A1 | 4/2006 |
| WO | 2007/098276 | A2 | 8/2007 |
| WO | 2008/092239 | A1 | 8/2008 |
| WO | 2009/073030 | A1 | 6/2009 |
| WO | 2010/148471 | A1 | 12/2010 |
| WO | 2011/002411 | A1 | 1/2011 |

OTHER PUBLICATIONS

"Frost Tooth Gullet Design," Armstrong Saw Engineer, Jul.-Dec. 1991, No. 139, Armstrong Manufacturing Co., Portland, Oregon.

International Preliminary Report on Patentability for International Application No. PCT/US2010/043442, dated Feb. 9, 2012 (6 pages).

International Search Report and Written Opinion of the International Searching Authority for PCT/US2010/043442, dated Sep. 21, 2010 (7 pages).

International Search Report and Written Opinion of the International Searching Authority for International Application No. PCT/US2011/042681, dated Nov. 25, 2011 (11 pages).

\* cited by examiner

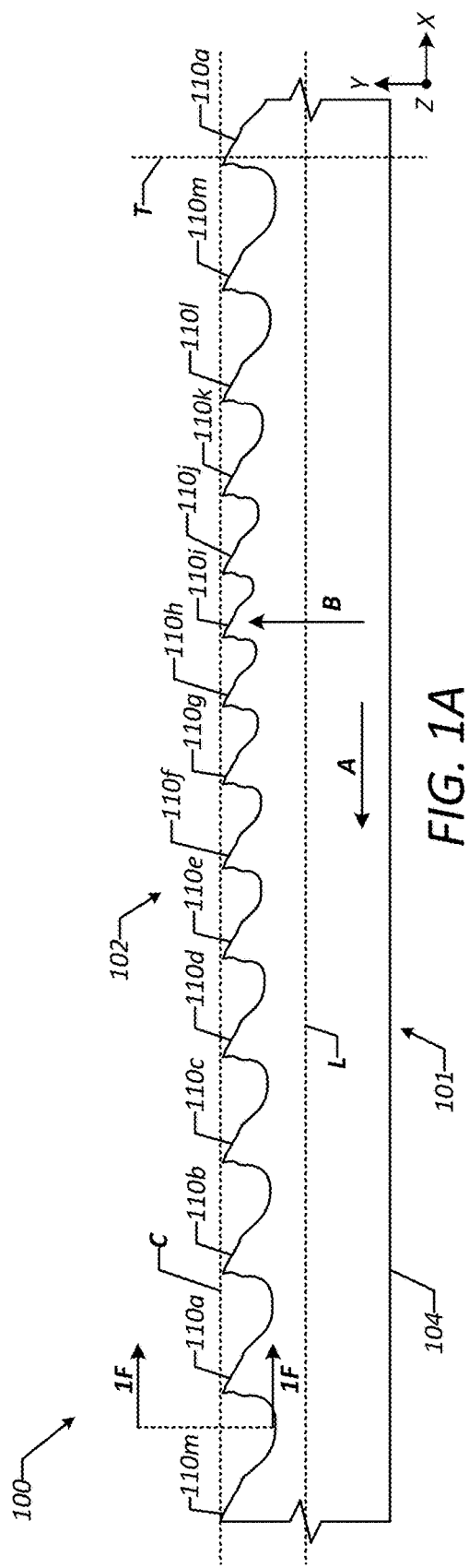
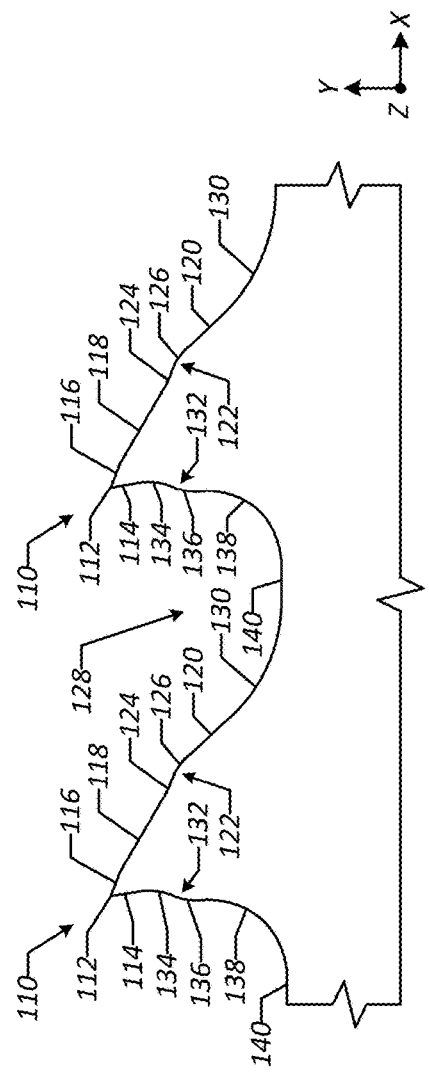
FIG. 1A
FIG. 1B

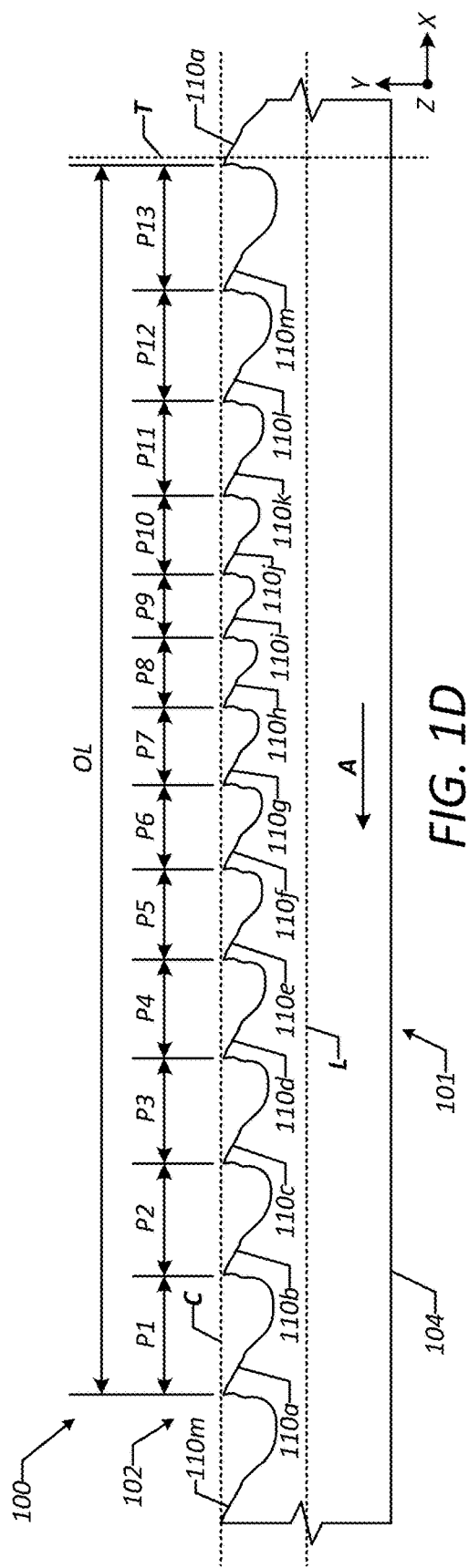
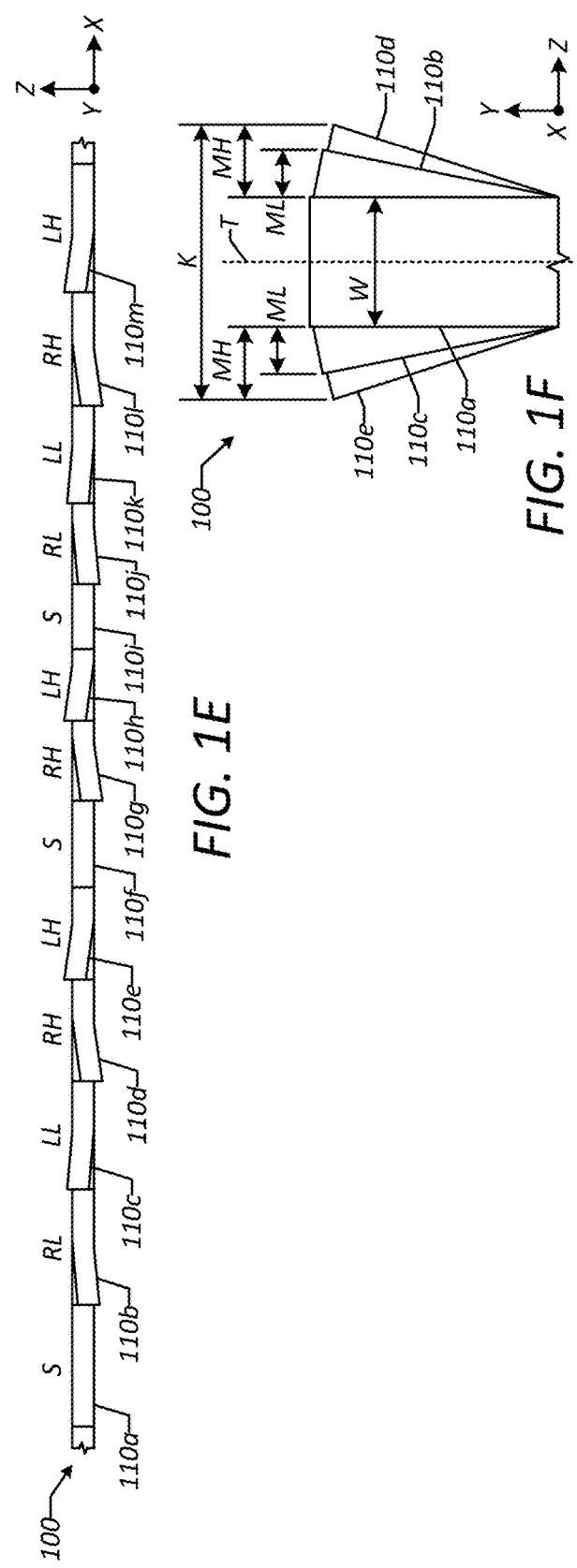

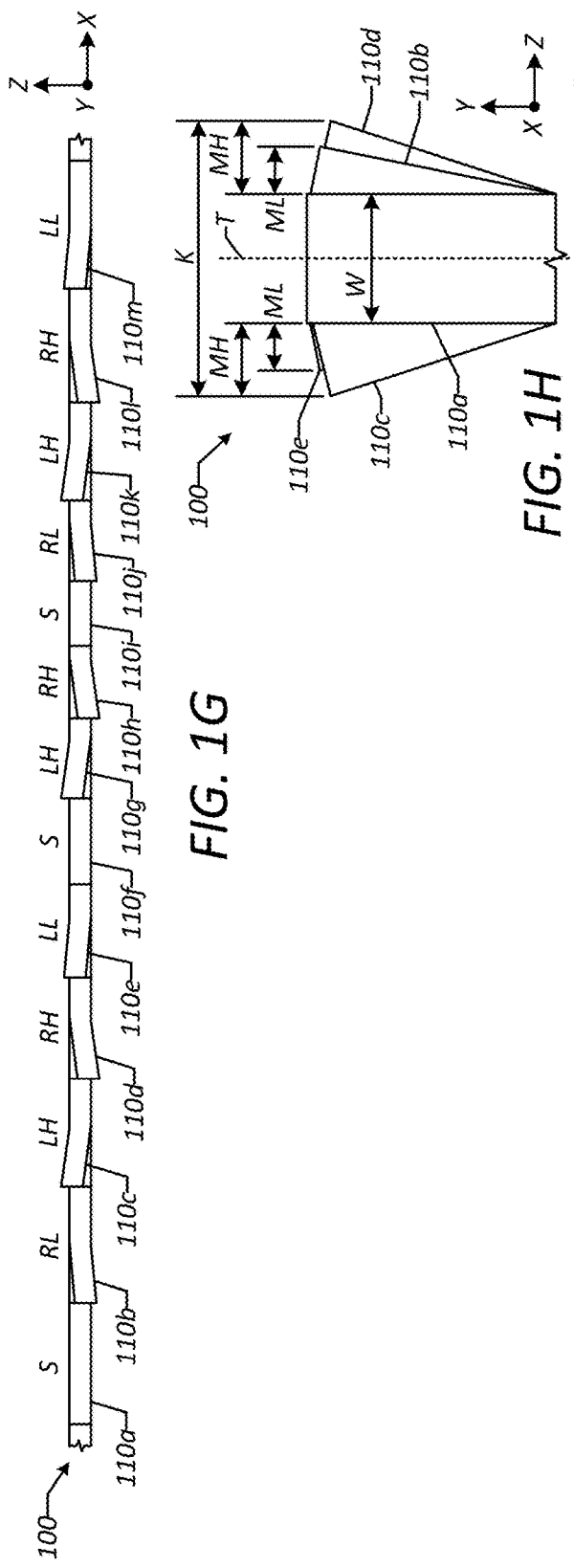
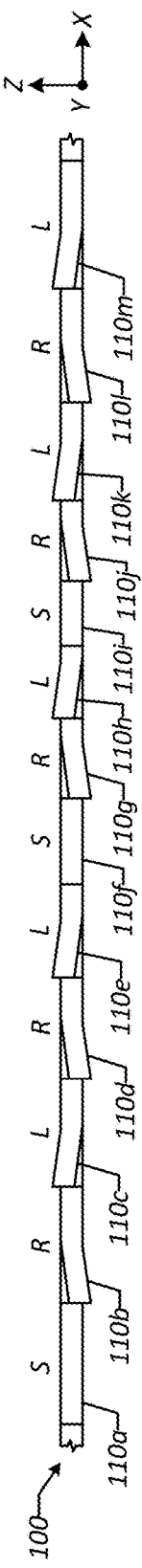
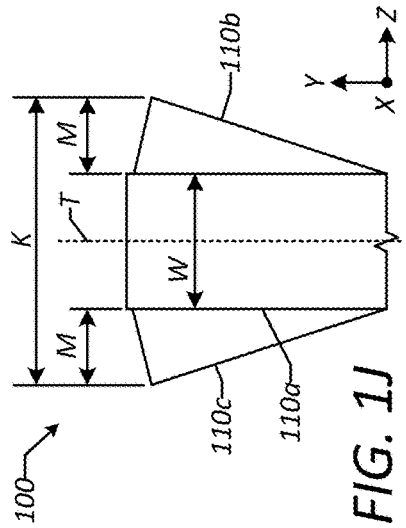
FIG. 1G
FIG. 1H
FIG. 1I
FIG. 1J

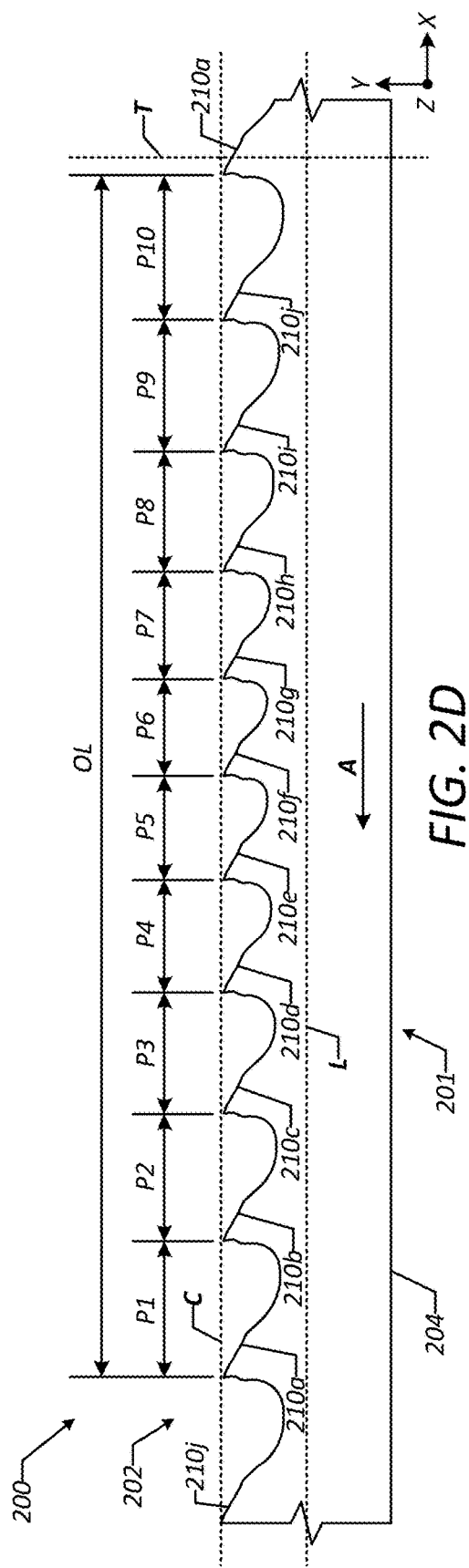
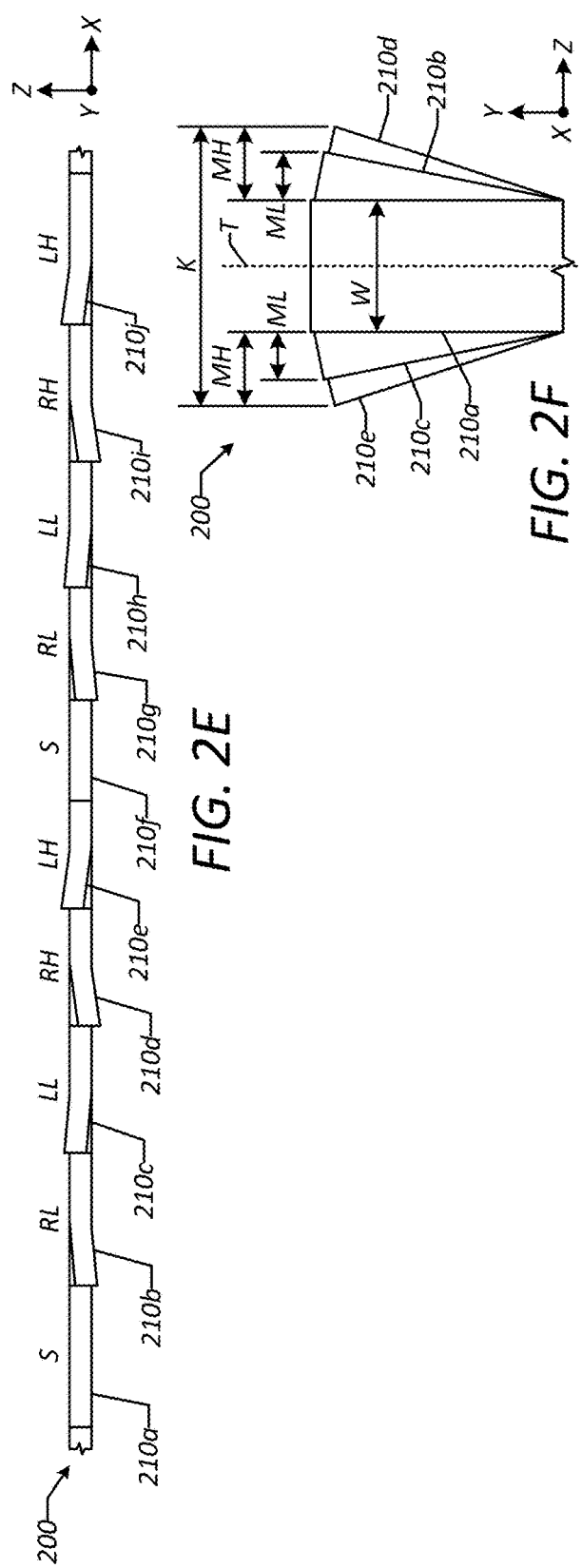
FIG. 2D
FIG. 2E
FIG. 2F

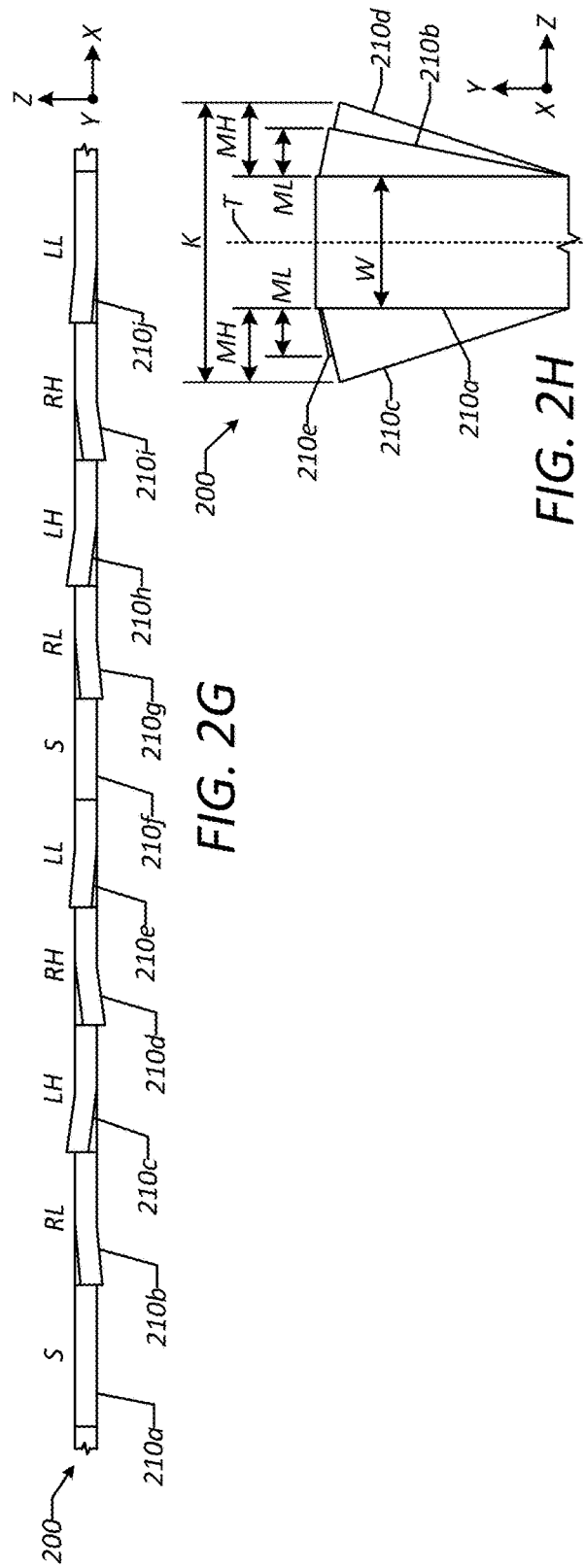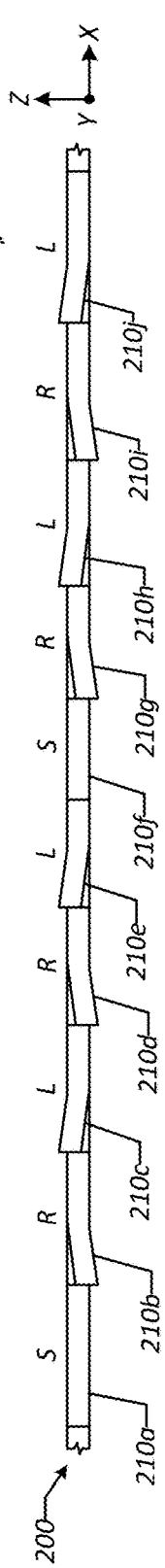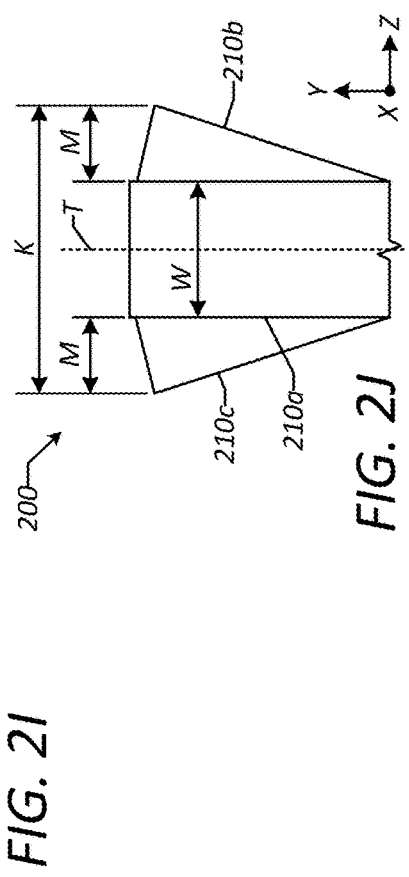

BAND SAW BLADE FOR CUTTING STRUCTURAL WORKPIECES

FIELD OF THE DISCLOSURE

The present disclosure relates generally to saw blades and methods for cutting a workpiece and more particularly to a band saw blade and a method for cutting large structural workpieces using the band saw blade.

BACKGROUND

Various types of saw blades are known in the art for cutting workpieces having different shapes and formed of different types of materials. For example, band saw blades often may be used for cutting larger workpieces formed of various types of metal or metal alloys. A band saw blade generally may be formed as a continuous band including a cutting edge and a back edge located on an opposite side of the saw blade relative to the cutting edge. The cutting edge may include a number of teeth configured to engage and cut a workpiece, and the back edge may include a linear or contoured surface configured to engage spaced rollers of a band saw machine. During operation of the band saw machine, the band saw blade may move in a cutting direction and a feed direction, and the rollers may apply pressure to the back edge as the opposing cutting edge cuts through the workpiece. Some band saw blades may have a bi-metal configuration, with a backing formed of a first metal and a number of tips formed of a second metal and welded to the backing. In this manner, each tooth may include a base portion formed of the first metal, a tip portion formed of the second metal, and a weld zone extending along the interface of the base portion and the tip portion. In some instances, the first metal may be a spring steel, and the second metal may be a tool steel.

Certain band saw blades may be designed for cutting large structural workpieces, such as I-beams, tubes, channels, pipes, or other structural members intended for industrial building purposes. Structural workpieces may be formed of steel or similar materials, may have relatively large wall thicknesses (e.g., equal to or greater than ¾ inches), and may include one or more weld zones. Cutting large structural workpieces, as opposed to solid workpieces, may present certain challenges in view of the high-impact nature of the cutting application. For example, as a band saw blade cuts through a large structural workpiece, multiple separate regions of tooth engagement may exist, with an impact loading associated with each region. The multiple regions of tooth engagement may result in increased occurrence of tooth damage, such as chipped teeth (i.e., removal of a portion of a tooth) or stripped teeth (i.e., failure of a tooth along the weld zone). Moreover, respective lengths of tooth engagement of the separate regions may change significantly as the band saw blade advances through the structural workpiece in the feed direction. As a result, the number of teeth engaging the workpiece may be greater than or less than the ideal range for efficient cutting at different points along the cut. Certain large structural workpieces may include highly localized "hard" regions which may increase a load experienced by the saw blade. For example, large structural tubes may include a linear weld. Such highly localized hard regions may result in increased occurrence of tooth damage as the band saw blade passes therethrough. In some instances, the fabrication of certain large structural workpieces may result in significant residual stresses in the material (i.e., the material may be in tension or compression), which may be relaxed during cutting of the workpiece. Such relaxation may result in the material expanding into the cut, thereby trapping the saw blade in a phenomenon known as "blade pinching." Although this may be an issue with cutting various types of large structural workpieces, blade pinching often may be a major concern when cutting a relatively long web section (e.g., having a length equal to or greater than 30 inches) of an I-beam. Ultimately, these challenges in cutting large structural workpieces may reduce the useful life of the band saw blade and necessitate frequent replacement.

SUMMARY

According to one aspect, a band saw blade may include a blade body including a cutting edge defined by a number of teeth spaced relative to each other. Each tooth may include a tip, a rake face formed on one side of the tip, a primary clearance surface formed on an opposite side of the tip relative to the rake face and defining a primary relief angle, a secondary clearance surface formed on an opposite side of the primary relief surface relative to the tip and defining a secondary relief angle that is greater than the primary relief angle, a tertiary clearance surface formed on an opposite side of the secondary clearance surface relative to the primary clearance surface and defining a tertiary relief angle that is greater than the secondary relief angle, a first protrusion formed between the secondary clearance surface and the tertiary clearance surface and having a first curvilinear shape, a gullet surface formed on an opposite side of the rake face relative to the tip, and a second protrusion formed between the rake face and the gullet surface and having a second curvilinear shape. The number of teeth may be spaced at varying pitch distances between adjacent teeth such that a difference between a minimum teeth per inch (TPI) based on a maximum pitch distance between a first pair of adjacent teeth and a maximum TPI based on a minimum pitch distance between a second pair of adjacent teeth is equal to or greater than 1. The number of teeth may define a set pattern that includes, with respect to a cutting direction of the band saw blade, a first unset tooth, a first pair of consecutive light set teeth formed adjacent the first unset tooth in a direction opposite the cutting direction and set to opposite sides of the blade body from one another to a light set magnitude, and a first pair of consecutive heavy set teeth formed adjacent the first pair of consecutive light set teeth in the direction opposite the cutting direction and set to opposite sides of the blade body from one another to a heavy set magnitude that is greater than the light set magnitude. The number of teeth may define a kerf width that is within a range of between approximately 0.115 inches to approximately 0.140 inches.

In certain example embodiments, the rake face may define a rake angle within a range of between approximately 8 degrees to approximately 12 degrees. In certain example embodiments, the rake angle may be approximately 10 degrees. In certain example embodiments, the primary relief angle may be within a range of between approximately 18 degrees to approximately 22 degrees. In certain example embodiments, the primary relief angle may be approximately 20 degrees. In certain example embodiments, the secondary relief angle may be within a range of between approximately 30 degrees to approximately 35 degrees. In certain example embodiments, the tertiary relief angle may be within a range of between approximately 40 degrees to approximately 55 degrees. In certain example embodiments, the primary clearance surface may have a first length in the cutting direction, the secondary clearance surface may have a second length in the cutting direction, and the second length may be greater than the first length. In certain example embodiments, the first length may be within a range of between approximately 0.010 inches to approximately 0.030 inches. In certain example embodiments, the first length may be approximately 0.020 inches.

In certain example embodiments, each tooth may include a tip portion formed of a first metal, a base portion formed of a second metal different than the first metal, and a weld zone extending in the cutting direction along an interface of the tip portion and the base portion. The first protrusion may extend over a first end of the weld zone, and the second protrusion may extend over an opposite second end of the weld zone. In certain example embodiments, the first protrusion may be defined by a concave surface and a convex surface. The concave surface may extend from the secondary clearance surface to the convex surface, and the convex surface may extend from the concave surface to the tertiary clearance surface. In certain example embodiments, the concave surface may have a first radius, and the convex surface may have a second radius different than the first radius. In certain example embodiments, the first radius may be greater than the second radius. In certain example embodiments, the first radius may be within a range of between approximately 0.125 inches to approximately 0.175 inches, and the second radius may be within a range of between approximately 0.075 inches to approximately 0.125 inches. In certain example embodiments, the first radius may be approximately 0.150 inches, and wherein the second radius may be approximately 0.100 inches. In certain example embodiments, the second protrusion may be defined by a concave surface and a convex surface. The concave surface may extend from the rake face to the convex surface, and the convex surface may extend from the concave surface to the gullet surface. In certain example embodiments, the concave surface may have a first radius, and the convex surface may have a second radius approximately equal to the first radius. In certain example embodiments, the first radius and the second radius may be within a range of between approximately 0.040 inches and approximately 0.080 inches. In certain example embodiments, the first radius and the second radius may be approximately 0.060 inches.

In certain example embodiments, the plurality of teeth may include a 13-tooth pitch pattern. In certain example embodiments, a first pitch distance between a first tooth and a second tooth may be approximately 0.472 inches, a second pitch distance between the second tooth and a third tooth may be approximately 0.444 inches, a third pitch distance between the third tooth and a fourth tooth may be approximately 0.418 inches, a fourth pitch distance between the fourth tooth and a fifth tooth may be approximately 0.390 inches, a fifth pitch distance between the fifth tooth and a sixth tooth may be approximately 0.362 inches, a sixth pitch distance between the sixth tooth and a seventh tooth may be approximately 0.333 inches, a seventh pitch distance between the seventh tooth and an eighth tooth may be approximately 0.306 inches, an eighth pitch distance between the eighth tooth and a ninth tooth may be approximately 0.278 inches, a ninth pitch distance between the ninth tooth and a tenth tooth may be approximately 0.250 inches, a tenth pitch distance between the tenth tooth and an eleventh tooth may be approximately 0.313 inches, an eleventh pitch distance between the eleventh tooth and a twelfth tooth may be approximately 0.375 inches, a twelfth pitch distance between the twelfth tooth and a thirteenth tooth may be approximately 0.438 inches, and a thirteenth pitch distance between the thirteenth tooth and a fourteenth tooth may be approximately 0.500 inches. In certain example embodiments, the difference between the minimum TPI and the maximum TPI may be equal to or greater than 2. In certain example embodiments, the difference between the minimum TPI and the maximum TPI may be 2. In certain example embodiments, the minimum TPI may be 2, and the maximum TPI may be 4. In certain example embodiments, the minimum TPI may be 4, and the maximum TPI may be 6.

In certain example embodiments, the plurality of teeth may include a 10-tooth pitch pattern. In certain example embodiments, a first pitch distance between a first tooth and a second tooth may be approximately 0.472 inches, a second pitch distance between the second tooth and a third tooth may be approximately 0.444 inches, a third pitch distance between the third tooth and a fourth tooth may be approximately 0.418 inches, a fourth pitch distance between the fourth tooth and a fifth tooth may be approximately 0.390 inches, a fifth pitch distance between the fifth tooth and a sixth tooth may be approximately 0.362 inches, a sixth pitch distance between the sixth tooth and a seventh tooth may be approximately 0.333 inches, a seventh pitch distance between the seventh tooth and an eighth tooth may be approximately 0.375 inches, an eighth pitch distance between the eighth tooth and a ninth tooth may be approximately 0.415 inches, a ninth pitch distance between the ninth tooth and a tenth tooth may be approximately 0.457 inches, and a tenth pitch distance between the tenth tooth and an eleventh tooth may be approximately 0.500 inches. In certain example embodiments, the difference between the minimum TPI and the maximum TPI may be 1. In certain example embodiments, the minimum TPI may be 2, and the maximum TPI may be 3. In certain example embodiments, the minimum TPI may be 3, and the maximum TPI may be 4.

In certain example embodiments, the first pair of consecutive light set teeth may include a first light set tooth offset to a right side of the blade body and a second light set tooth formed adjacent the first light set tooth in the direction opposite the cutting direction and offset to a left side of the blade body, and the first pair of consecutive heavy set teeth may include a first heavy set tooth offset to the right side of the blade body and a second heavy set tooth formed adjacent the first heavy set tooth in the direction opposite the cutting direction and offset to the left side of the blade body. In certain example embodiments, the set pattern further may include a second unset tooth formed adjacent the first pair of consecutive heavy set teeth in the direction opposite the cutting direction, and a second pair of consecutive heavy set teeth formed adjacent the second unset tooth in the direction opposite the cutting direction and set to opposite sides of the blade body from one another to the heavy set magnitude. In certain example embodiments, the first pair of consecutive light set teeth may include a first light set tooth offset to a right side of the blade body and a second light set tooth formed adjacent the first light set tooth in the direction opposite the cutting direction and offset to a left side of the blade body, the first pair of consecutive heavy set teeth may include a first heavy set tooth offset to the right side of the blade body and a second heavy set tooth formed adjacent the first heavy set tooth in the direction opposite the cutting direction and offset to the left side of the blade body, and the second pair of consecutive heavy set teeth may include a third heavy set tooth offset to the right side of the blade body and a fourth heavy set tooth formed adjacent the third heavy set tooth in the direction opposite the cutting direction and offset to the left side of the blade body.

In certain example embodiments, the set pattern further may include a third unset tooth formed adjacent the second pair of consecutive heavy set teeth in the direction opposite the cutting direction, a second pair of consecutive light set teeth formed adjacent the third unset tooth in the direction opposite the cutting direction and set to opposite sides of the blade body from one another to the light set magnitude, and a third pair of consecutive heavy set teeth formed adjacent the second pair of consecutive light set teeth in the direction opposite the cutting direction and set to opposite sides of the blade body from one another to the heavy set magnitude. In certain example embodiments, the first pair of consecutive light set teeth may include a first light set tooth offset to a right side of the blade body and a second light set tooth formed adjacent the first light set tooth in the direction opposite the cutting direction and offset to a left side of the blade body, the first pair of consecutive heavy set teeth may include a first heavy set tooth offset to the right side of the blade body and a second heavy set tooth formed adjacent the first heavy set tooth in the direction opposite the cutting direction and offset to the left side of the blade body, the second pair of consecutive heavy set teeth may include a third heavy set tooth offset to the right side of the blade body and a fourth heavy set tooth formed adjacent the third heavy set tooth in the direction opposite the cutting direction and offset to the left side of the blade body, the second pair of consecutive light set teeth may include a third light set tooth offset to the right side of the blade body and a fourth light set tooth formed adjacent the third light set tooth in the direction opposite the cutting direction and offset to the left side of the blade body, and the third pair of consecutive heavy set teeth may include a fifth heavy set tooth offset to the right side of the blade body and a sixth heavy set tooth formed adjacent the fifth heavy set tooth in the direction opposite the cutting direction and offset to the left side of the blade body. In certain example embodiments, the kerf width may be within a range of between approximately 0.115 inches to approximately 0.140 inches. In certain example embodiments, the kerf width may be approximately 0.125 inches.

According to another aspect, a band saw blade may include a blade body including a cutting edge defined by a number of teeth spaced relative to each other. Each tooth may include a tip, a rake face formed on one side of the tip, a primary clearance surface formed on an opposite side of the tip relative to the rake face and defining a primary relief angle, a secondary clearance surface formed on an opposite side of the primary relief surface relative to the tip and defining a secondary relief angle that is greater than the primary relief angle, a tertiary clearance surface formed on an opposite side of the secondary clearance surface relative to the primary clearance surface and defining a tertiary relief angle that is greater than the secondary relief angle, and a protrusion formed between the secondary clearance surface and the tertiary clearance surface and having a curvilinear shape. The protrusion may be defined by a concave surface and a convex surface. The concave surface may extend from the secondary clearance surface to the convex surface, and the convex surface may extend from the concave surface to the tertiary clearance surface.

In certain example embodiments, the concave surface may have a first radius, and the convex surface may have a second radius different than the first radius. In certain example embodiments, the first radius may be greater than the second radius. In certain example embodiments, the first radius may be within a range of between approximately 0.125 inches to approximately 0.175 inches, and the second radius may be within a range of between approximately 0.075 inches to approximately 0.125 inches. In certain example embodiments, the primary relief angle may be within a range of between approximately 18 degrees to approximately 22 degrees, and the secondary relief angle may be within a range of between approximately 30 degrees to approximately 35 degrees.

According to still another aspect, a band saw blade may include a blade body including a cutting edge defined by a number of teeth spaced relative to each other. Each tooth may include a tip, a rake face formed on one side of the tip, a primary clearance surface formed on an opposite side of the tip relative to the rake face and defining a primary relief angle, a secondary clearance surface formed on an opposite side of the primary relief surface relative to the tip and defining a secondary relief angle that is greater than the primary relief angle, a tertiary clearance surface formed on an opposite side of the secondary clearance surface relative to the primary clearance surface and defining a tertiary relief angle that is greater than the secondary relief angle, a gullet surface formed on an opposite side of the rake face relative to the tip, and a protrusion formed between the rake face and the gullet surface and having a curvilinear shape. The protrusion may be defined by a concave surface and a convex surface. The concave surface may extend from the rake face to the convex surface, and the convex surface may extend from the concave surface to the gullet surface. The concave surface may have a first radius, and the convex surface may have a second radius approximately equal to the first radius.

In certain example embodiments, the first radius and the second radius may be within a range of between approximately 0.040 inches to approximately 0.080 inches. In certain example embodiments, the first radius and the second radius may be approximately 0.060 inches. In certain example embodiments, the rake face may define a rake angle within a range of between approximately 8 degrees to approximately 12 degrees. In certain example embodiments, the rake angle may be approximately 10 degrees.

These and other example embodiments of the disclosure are described in more detail through reference to the accompanying drawings in the detailed description that follows. This brief summary is provided for the reader's convenience and is not intended to limit the scope of the claims or the preceding sections. Furthermore, the techniques described above and below may be implemented in a number of ways and in a number of contexts. Several example implementations and contexts are provided with reference to the accompanying drawings, as described below in more detail. However, the following implementations and contexts are but a few of many.

As described in detail below, certain example embodiments of the band saw blade may be particularly suitable for cutting large structural workpieces, such as I-beams, tubes, channels, pipes, or other structural members. For example, teeth of the band saw blade may have a robust tooth form that advantageously provides a reduction in required cut force, which may increase cut speed and enhance resistance to tooth damage, such as chipping and/or stripping of the teeth. Additionally, the band saw blade may have teeth spaced at varying pitch distances between adjacent teeth such that the teeth are arranged in a variable pitch pattern that minimizes vibration and accommodates significant changes in tooth engagement length which may exist when cutting large structural workpieces. Further, the band saw blade may define a multi-level set pattern that promotes straight cutting throughout the life of the blade as well as an extra-wide kerf that inhibits blade pinching when cutting large structural workpieces. The combination of these features of the band saw blade provide enhanced performance in high-impact cutting applications while also achieving a substantial, and unexpectedly high, increase in the useful life of the saw blade.

BRIEF DESCRIPTION OF THE DRAWINGS

The detailed description is set forth with reference to the accompanying drawings. The use of the same reference numerals may indicate similar or identical items. Various embodiments may utilize elements and/or features other than those illustrated in the drawings, and some elements and/or features may not be present in various embodiments. Elements and/or features in the drawings are not necessarily drawn to scale. Throughout this disclosure, depending on the context, singular and plural terminology may be used interchangeably.

FIG. 1A is a side view of a portion of a band saw blade in accordance with one or more embodiments of the disclosure.

FIG. 1B is a detailed side view of a portion of the band saw blade of FIG. 1A, illustrating a typical tooth configuration of the band saw blade.

FIG. 1D is a side view of a portion of the band saw blade of FIG. 1A, illustrating a pitch pattern of the band saw blade.

FIG. 1E is a top view of a portion of the band saw blade of FIG. 1A, illustrating a set pattern of the band saw blade in accordance with one or more embodiments of the disclosure.

FIG. 1F is a detailed end view of a portion of the band saw blade of FIG. 1A having the set pattern of FIG. 1E.

FIG. 1G is a top view of a portion of the band saw blade of FIG. 1A, illustrating a set pattern of the band saw blade in accordance with one or more embodiments of the disclosure.

FIG. 1H is a detailed end view of a portion of the band saw blade of FIG. 1A having the set pattern of FIG. 1G.

FIG. 1I is a top view of a portion of the band saw blade of FIG. 1A, illustrating a set pattern of the band saw blade in accordance with one or more embodiments of the disclosure.

FIG. 1J is a detailed end view of a portion of the band saw blade of FIG. 1A having the set pattern of FIG. 1I.

FIG. 2D is a side view of a portion of the band saw blade of FIG. 2A, illustrating a pitch pattern of the band saw blade.

FIG. 2E is a top view of a portion of the band saw blade of FIG. 2A, illustrating a set pattern of the band saw blade in accordance with one or more embodiments of the disclosure.

FIG. 2F is a detailed end view of a portion of the band saw blade of FIG. 2A having the set pattern of FIG. 2E.

FIG. 2G is a top view of a portion of the band saw blade of FIG. 2A, illustrating a set pattern of the band saw blade in accordance with one or more embodiments of the disclosure.

FIG. 2H is a detailed end view of a portion of the band saw blade of FIG. 2A having the set pattern of FIG. 2G.

FIG. 2I is a top view of a portion of the band saw blade of FIG. 2A, illustrating a set pattern of the band saw blade in accordance with one or more embodiments of the disclosure.

FIG. 2J is a detailed end view of a portion of the band saw blade of FIG. 2A having the set pattern of FIG. 2I.

DETAILED DESCRIPTION OF EXAMPLE EMBODIMENTS

Figure 1C:
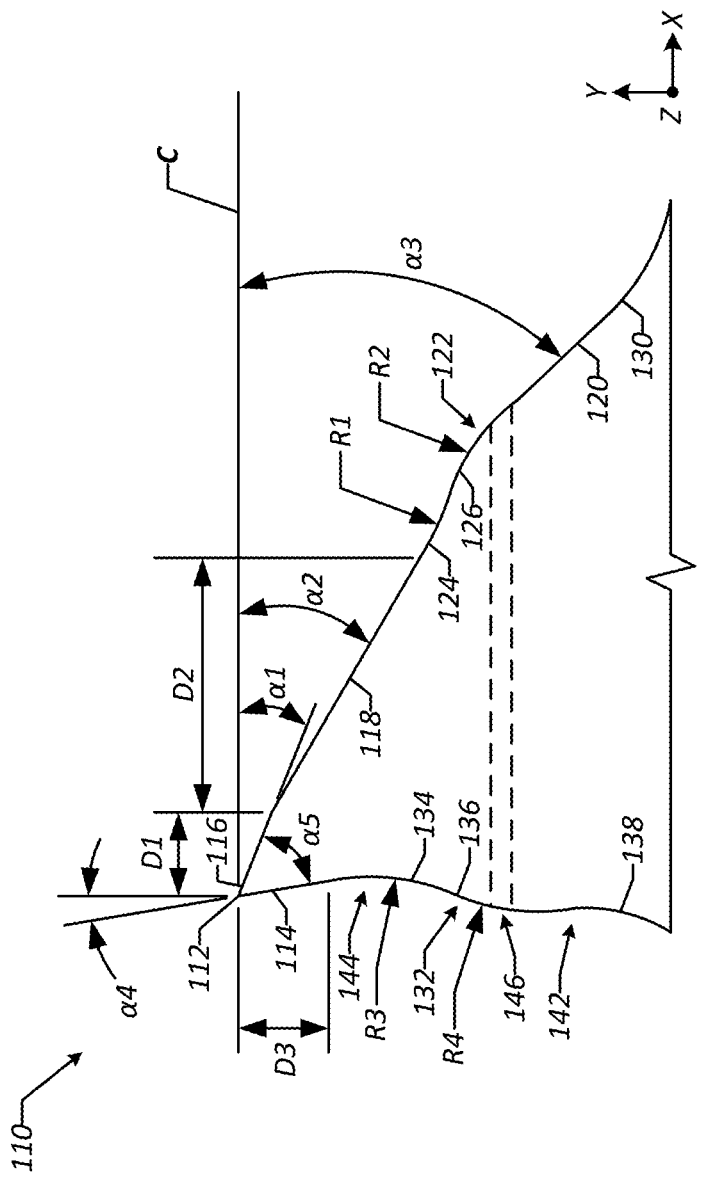
FIG. 1C is a detailed side view of a portion of the band saw blade of FIG. 1A, illustrating a typical tooth configuration of the band saw blade.

Described below are example embodiments of a band saw blade as well as individual features of the band saw blade. The band saw blade may be used with a band saw machine to cut a workpiece. As described below, the band saw blade may be particularly suitable for cutting large structural workpieces, such as I-beams, tubes, channels, pipes, or other structural members. In particular, teeth of the band saw blade may have a robust tooth form that provides enhanced resistance to tooth damage, such as chipping and/or stripping of the teeth. Additionally, the band saw blade may have teeth spaced at varying pitch distances between adjacent teeth such that the teeth are arranged in a variable pitch pattern that minimizes vibration and accommodates significant changes in tooth engagement length which may exist when cutting large structural workpieces. Further, the band saw blade may define a multi-level set pattern that promotes straight cutting throughout the life of the blade as well as an extra-wide kerf that inhibits blade pinching when cutting large structural workpieces. Ultimately, these features of the band saw blade may extend the useful life of the blade while also providing enhanced performance in high-impact cutting applications.

These and other example embodiments of the disclosure are described in more detail through reference to the accompanying drawings in the detailed description that follows. This brief overview, including section titles and corresponding summaries, is provided for the reader's convenience and is not intended to limit the scope of the claims or the preceding sections. Furthermore, the techniques described above and below may be implemented in a number of ways and in a number of contexts. Several example implementations and contexts are provided with reference to the accompanying drawings, as described below in more detail. However, the following implementations and contexts are but a few of many.

Certain components or features of the band saw blade may be described herein with reference to example embodiments illustrated in the drawings; however, such components or features are not limited to the example embodiments illustrated in the drawings. Certain components or features of the band saw blade may be described herein as having a length extending relative to an x-axis, a height extending relative to a y-axis, and/or a width or thickness extending relative to a z-axis. The respective axes are shown in the drawings with respect to the band saw blade or components thereof.

Certain components or features of the band saw blade may be described herein using the terms "top," "bottom," "front," "back," or "side." It will be understood that these terms are used to describe a relative position of a component or feature of the band saw blade when the band saw blade is in a particular orientation, such as an orientation shown in the drawings. Certain relationships between components or features of the band saw blade may be described herein using the terms "above," "below," "in front of," or "behind." It will be understood that these terms are used to describe a relative relationship between two or more components or features of the band saw blade when the band saw blade is in a particular orientation, such as an orientation shown in the drawings.

Certain components or features of the band saw blade may be described herein using the terms "first," "second," "third," etc. These terms are used only to distinguish one component or feature from another identical or similar component or feature. For example, a "first" component or feature could be termed a "second" component or feature, and, similarly, a "second" component or feature could be termed a "first" component or feature, without departing from the scope of the disclosure. Additionally, as used herein the term "and/or" includes any and all combinations of one or more of the associated listed items.

Certain dimensions or properties of components or features of the band saw blade may be described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit. As used herein, the term "approximately equal" indicates that the equal relationship is not a strict relationship and does not exclude functionally similar variations therefrom. Unless context or the description indicates otherwise, the use of the term "approximately equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions.

Certain relationships between dimensions of the band saw blade or between features of the band saw blade may be described herein using the term "substantially." As used herein, the term "substantially constant" indicates that the constant relationship is not a strict relationship and does not exclude functionally similar variations therefrom. Unless context or the description indicates otherwise, the use of the term "substantially constant" in connection with a described dimension indicates that the dimension includes variations that, using mathematical and industrial principles accepted in the art (e.g., rounding, measurement or other systematic errors, manufacturing tolerances, etc.), would not vary the least significant digit of the dimension. As used herein, the term "substantially parallel" indicates that the parallel relationship is not a strict relationship and does not exclude functionally similar variations therefrom.

Example Embodiments

FIGS. 1A-1J illustrate a band saw blade 100 (which also may be referred to as a "structural band saw blade," a "saw blade," or a "blade") as well as individual components and features of the band saw blade 100 in accordance with one or more example embodiments of the disclosure. The band saw blade 100 may be used with a band saw machine to cut a workpiece. As described below, the band saw blade 100 may be particularly suitable for cutting large structural workpieces, such as I-beams, tubes, channels, pipes, or other structural members. In particular, teeth of the band saw blade 100 may have a robust tooth form that provides enhanced resistance to tooth damage, such as chipping and/or stripping of the teeth. Additionally, the band saw blade 100 may have teeth spaced at varying pitch distances between adjacent teeth such that the teeth are arranged in a variable pitch pattern that minimizes vibration and accommodates significant changes in tooth engagement length which may exist when cutting large structural workpieces. Further, the band saw blade 100 may define a multi-level set pattern that promotes straight cutting throughout the life of the blade 100 as well as an extra-wide kerf that inhibits blade pinching when cutting large structural workpieces. Ultimately, these features of the band saw blade 100 may extend the useful life of the blade while also providing enhanced performance in high-impact cutting applications.

The band saw blade 100 may be formed as a continuous (i.e., endless) band configured for use in a band saw machine. As shown in FIG. 1A, the band saw blade 100 may include a blade body 101 having a cutting edge 102 and a back edge 104 located on an opposite side of the saw blade 100 relative to the cutting edge 102. The cutting edge 102 and the back edge 104 may extend along a total circumferential length of the band saw blade 100. The cutting edge 102 may be configured to engage and cut a workpiece, and the back edge 104 may be configured to engage spaced rollers of the band saw machine. As shown in FIG. 1A, the band saw blade 100 may define a cutting direction A and a feed direction B, based on the orientation and configuration of the cutting edge 102 and the back edge 104. The cutting edge 102 may include a plurality of teeth 110 spaced relative to one another along the band saw blade 100. In certain example embodiments, as shown, the plurality of teeth 110 may include a plurality of recurrent or repetitive patterns of the teeth 110 defining a 13-tooth pitch pattern. Each pitch pattern may be defined by a recurrent group of thirteen teeth 110, including a first tooth 110a, a second tooth 110b, a third tooth 110c, a fourth tooth 110d, a fifth tooth 110e, a sixth tooth 110f, a seventh tooth 110g, an eighth tooth 110h, a ninth tooth 110i, a tenth tooth 110j, an eleventh tooth 110k, a twelfth tooth 110l, and a thirteenth tooth 110m. The cutting edge 102 may define a cutting plane C extending through the tips of the teeth 110 (prior to setting) or through the tips of the unset teeth 110 (after setting), as shown, and the teeth 110 may be configured to engage and cut the workpiece as the band saw 100 moves in the cutting direction A and the feed direction B. It will be appreciated that the cutting direction A of the band saw blade 100 corresponds to the orientation of the teeth 110 of the cutting edge 102, and that the feed direction B corresponds to the orientation of the cutting edge 102 relative to the back edge 104. As shown, the band saw blade 100 may have a longitudinal axis L extending parallel to the cutting plane C and parallel to the back edge 104 (according to embodiments in which the back edge 104 is formed as a planar edge). The band saw blade 100 also may have a transverse axis T extending perpendicular to the cutting plane C and the longitudinal axis L.

The teeth 110 may have a tooth form as illustrated in detail in FIGS. 1B and 1C for a typical tooth 110. As shown, each tooth 110 may include a tip 112, a rake face 114 formed on one side of the tip 112 (i.e., a leading side of the tooth 110), and a primary clearance surface 116 formed on an opposite side of the tip 112 relative to the rake face 114 (i.e., a trailing side of the tooth 110). In this manner, the tip 112 may be defined by the intersection of the rake face 114 and the primary clearance surface 116. As shown, the primary clearance surface 116 may be formed as a planar surface defining a primary relief angle $\alpha 1$ relative to the cutting plane C or the back edge 104. Each tooth 110 also may include a secondary clearance surface 118 formed on an opposite side of the primary clearance surface 116 relative to the tip 112. As shown, the secondary clearance surface 118 may be formed as a planar surface defining a secondary relief angle $\alpha 2$ relative to the cutting plane C or the back edge 104. Each tooth 110 also may include a tertiary clearance surface 120 formed on an opposite side of the secondary clearance surface 118 relative to the primary clearance surface 116. As shown, the tertiary clearance surface 120 may be formed as a planar surface defining a tertiary relief angle $\alpha 3$ relative to the cutting plane C or the back edge 104. Each tooth 110 further may include a first protrusion 122 (which also may be referred to as a "relief face protrusion") formed between the secondary clearance surface 118 and the tertiary clearance surface 120. The first protrusion 122 may have a curvilinear shape and may be defined by a concave surface 124 and a convex surface 126. As shown, the primary clearance surface 116 may extend from the tip 112 to the secondary clearance surface 118, the secondary clearance surface 118 may extend from the primary clearance surface 116 to the concave surface 124, the concave surface 124 may extend from the secondary clearance surface 118 to the convex surface 126, and the convex surface 126 may extend from the concave surface 124 to the tertiary clearance surface 120. The tertiary clearance surface 120 may extend from the convex surface 126 to a first concave gullet surface 130 of a gullet 128 defined by the tooth 110.

As shown in FIG. 1C, the secondary relief angle $\alpha 2$ may be greater than the primary relief angle $\alpha 1$, and the tertiary relief angle $\alpha 3$ may be greater than the secondary relief angle $\alpha 2$. In certain example embodiments, the primary relief angle $\alpha 1$ may be within a range of between approximately 18 degrees to approximately 22 degrees. In certain example embodiments, the primary relief angle $\alpha 1$ may be approximately 20 degrees. In certain example embodiments, the secondary relief angle $\alpha 2$ may be within a range of between approximately 30 degrees to approximately 35 degrees. In certain example embodiments, the secondary relief angle $\alpha 2$ may be approximately 30 degrees. In certain example embodiments, the tertiary relief angle $\alpha 3$ may be within a range of between approximately 40 degrees to approximately 55 degrees. In certain example embodiments, the tertiary relief angle $\alpha 3$ may be approximately 45 degrees. As shown in FIG. 1C, the primary clearance surface 116 may have a first length D1 in the cutting direction A, and the secondary clearance surface 118 may have a second length D2 in the cutting direction A. The second length D2 may be greater than the first length D1, as shown. In certain example embodiments, the first length D1 may be within a range of between approximately 0.010 inches to approximately 0.030 inches. In certain example embodiments, the first length D1 may be approximately 0.020 inches.

As shown in FIG. 1C, the concave surface 124 of the first protrusion 122 may have a first radius R1, and the convex surface 126 of the first protrusion 122 may have a second radius R2. The first radius R1 may be different from the second radius R2, as shown. In certain example embodiments, the first radius R1 may be within a range of between approximately 0.125 inches to approximately 0.175 inches, and the second radius R2 may be within a range of between approximately 0.075 inches to approximately 0.125 inches. In certain example embodiments, the first radius R1 may be approximately 0.150 inches, and the second radius R2 may be approximately 0.100 inches.

As shown in FIG. 1C, the rake face 114 may be formed as a planar surface defining a rake angle $\alpha 4$ relative to a plane extending perpendicular to the cutting plane C or the back edge 104. In this manner, the rake face 114 and the primary clearance surface 116 may define an included tip angle $\alpha 5$ therebetween. Each tooth also may include a second protrusion 132 (which also may be referred to as a "rake face protrusion") formed between the rake face 114 and a second concave gullet surface 138 of the gullet 128. The second protrusion 132 may have a curvilinear shape and may be defined by a concave surface 134 and a convex surface 136. As shown, the rake face 114 may extend from the tip 112 to the concave surface 134, the concave surface 134 may extend from the rake face 114 to the convex surface 136, and the convex surface 136 may extend from the concave surface 134 to the second concave gullet surface 138. For some of the gullets 128 of the cutting edge 102, a planar gullet surface 140 may extend from the second concave gullet surface 138 to the first concave gullet surface 130, as shown in FIG. 1B. The planar gullet surface 140 may extend parallel or substantially parallel to the cutting plane C or the back edge 104. For other gullets 128 of the cutting edge 102, the second concave gullet surface 138 may extend to the first concave gullet surface 130.

In certain example embodiments, the rake angle $\alpha 4$ may be within a range of between approximately 8 degrees to approximately 12 degrees. In certain example embodiments, the rake angle $\alpha 4$ may be approximately 10 degrees. In certain example embodiments, the included tip angle $\alpha 5$ may be within a range of between approximately 56 degrees to approximately 64 degrees. In certain example embodiments, the included tip angle $\alpha 5$ may be approximately 60 degrees. As shown in FIG. 1C, the rake face 114 may have a height D3 in the direction perpendicular to the cutting plane C or the back edge 104. In certain example embodiments, the height D3 may be within a range of between approximately 0.013 inches to approximately 0.033 inches. In certain example embodiments, the height D3 may be approximately 0.023 inches. As shown in FIG. 1C, the concave surface 134 of the second protrusion 132 may have a third radius R3, and the convex surface 136 of the second protrusion 132 may have a fourth radius R4. The third radius R3 may be equal to or approximately equal to the fourth radius R4, as shown. In certain example embodiments, the third radius R3 and the fourth radius R4 may be within a range of between approximately 0.040 inches to approximately 0.080 inches. In certain example embodiments, the third radius R3 and the fourth radius R4 may be approximately 0.060 inches.

The band saw blade 100 may have a bi-metal configuration, including a backing formed of a first metal and a plurality of tips formed of a second metal and welded to the backing. In this manner, each tooth 110 may include a base portion 142 formed of the first metal, a tip portion 144 formed of the second metal, and a weld zone 146 (indicated by dashed lines) extending along the interface of the base portion 142 and the tip portion 144, as shown in FIG. 1C. In certain example embodiments, the weld zone 146 may extend parallel or substantially parallel to the cutting plane C of the saw blade 100. As shown, the first protrusion 122 may extend over a first end of the weld zone 146, and the second protrusion 132 may extend over an opposite second end of the weld zone 146. In this manner, the first protrusion 122 and the second protrusion 132 may provide the tooth 110 with enhanced strength along the weld zone 146 to inhibit stripping of the tooth 110. In certain example embodiments, the first metal may be a spring steel, and the second metal may be a tool steel.

As shown in FIG. 1D, the plurality of teeth 110 may be spaced at varying pitch distances between adjacent teeth 110, with each tooth 110 having a particular pitch distance or tooth spacing P between that tooth 110 and the following adjacent tooth 110 in the direction opposite the cutting direction A. The pitch distance P may be measured between the tips 112 of adjacent teeth 110, as shown, or between any of numerous other corresponding points between adjacent teeth 110. As shown, the plurality of teeth 110 may define a 13-tooth pitch pattern. In this manner, for the group of thirteen teeth 110, a first pitch distance P1 may be defined between the first tooth 110a and the second tooth 110b, a second pitch distance P2 may be defined between the second tooth 110b and the third tooth 110c, a third pitch distance P3 may be defined between the third tooth 110c and the fourth tooth 110d, a fourth pitch distance P4 may be defined between the fourth tooth 110d and the fifth tooth 110e, a fifth pitch distance P5 may be defined between the fifth tooth 110e and the sixth tooth 110f, a sixth pitch distance P6 may be defined between the sixth tooth 110f and the seventh tooth 110g, a seventh pitch distance P7 may be defined between the seventh tooth 110g and the eighth tooth 110h, an eighth pitch distance P8 may be defined between the eighth tooth 110h and the ninth tooth 110i, a ninth pitch distance P9 may be defined between the ninth tooth 110i and the tenth tooth 110j, a tenth pitch distance P10 may be defined between the tenth tooth 110j and the eleventh tooth 110k, an eleventh pitch distance P11 may be defined between the eleventh tooth 110k and the twelfth tooth 110l, a twelfth pitch distance P12 may be defined between the twelfth tooth 110l and the thirteenth tooth 110m, and a thirteenth pitch distance P13 may be defined between the thirteenth tooth 110m and the first tooth 110a of the next group of teeth 110.

The variable pitch pattern of the teeth 110 may include a minimum pitch distance between a first pair of adjacent teeth 110 and a maximum pitch distance between a second pair of adjacent teeth 110. In certain example embodiments, as shown, the ninth pitch distance P9 may be the minimum pitch distance, and the thirteenth pitch distance P13 may be the maximum pitch distance. Based on the known pitch distance for a pair of adjacent teeth 110 in the pitch pattern, the teeth per inch (TPI) may be determined for that portion of the pitch pattern according to the equation TPI=(1/(pitch distance)). The minimum pitch distance of the pitch pattern may correspond to a maximum TPI of the pitch pattern, and the maximum pitch distance of the pitch pattern may correspond to a minimum TPI of the pitch pattern. In certain example embodiments, a difference between the minimum TPI based on the maximum pitch distance of the pitch pattern and the maximum TPI based on the minimum pitch distance of the pitch pattern may be equal to or greater than 2. In certain example embodiments, the difference between the minimum TPI based on the maximum pitch distance of the pitch pattern and the maximum TPI based on the minimum pitch distance of the pitch pattern may be equal to 2. In certain example embodiments, the variable pitch pattern may define a ⅔ pitch pattern. In other words, the minimum TPI based on the maximum pitch distance of the pitch pattern may be 2, and the maximum TPI based on the minimum pitch distance of the pitch pattern may be 4. In this manner, the minimum pitch distance of the pitch pattern may be 0.250 inches, and the maximum pitch distance of the pitch pattern may be 0.500 inches. In certain example embodiments, the first pitch distance P1 may be 0.472 inches, the second pitch distance P2 may be 0.444 inches, the third pitch distance P3 may be 0.418 inches, the fourth pitch distance P4 may be 0.390 inches, the fifth pitch distance P5 may be 0.362 inches, the sixth pitch distance P6 may be 0.333 inches, the seventh pitch distance P7 may be 0.306 inches, the eighth pitch distance P8 may be 0.278 inches, the ninth pitch distance P9 may be 0.250 inches, the tenth pitch distance P10 may be 0.313 inches, the eleventh pitch distance P11 may be 0.375, the twelfth pitch distance P12 may be 0.438 inches, and the thirteenth pitch distance P13 may be 0.500 inches. In certain example embodiments, an overall length OL of the group of thirteen teeth 110 may be 4.879 inches.

In certain example embodiments, the plurality of teeth 110 may define a multi-level set pattern. FIGS. 1E and 1F illustrate a first multi-level set pattern in accordance with one or more embodiments of the disclosure. As shown, the first multi-level set pattern may be a five/three/five set pattern defined by a first group of five consecutive teeth 110, a second group of three consecutive teeth 110, and a third group of five consecutive teeth 110. The first group of teeth may include, with respect to the cutting direction A, a first unset tooth (i.e., a "straight" or "raker" tooth), a first pair of consecutive light set teeth formed adjacent the first unset tooth in a direction opposite the cutting direction A and set to opposite sides of the blade body 101 from one another to a light set magnitude ML, and a first pair of consecutive heavy set teeth formed adjacent the first pair of consecutive light set teeth in the direction opposite the cutting direction A and set to opposite sides of the blade body 101 from one another to a heavy set magnitude MH that is greater than the light set magnitude ML. The second group of teeth may include, a second unset tooth formed adjacent the first pair of consecutive heavy set teeth in the direction opposite the cutting direction A, and a second pair of consecutive heavy set teeth formed adjacent the second unset tooth in the direction opposite the cutting direction A and set to opposite sides of the blade body 101 from one another to the heavy set magnitude MH. The third group of teeth may include, a third unset tooth formed adjacent the second pair of consecutive heavy set teeth in the direction opposite the cutting direction A, a second pair of consecutive light set teeth formed adjacent the third unset tooth in the direction opposite the cutting direction A and set in opposite directions from one another to the light set magnitude ML, and a third pair of consecutive heavy set teeth formed adjacent the second pair of consecutive light set teeth in the direction opposite the cutting direction A and set in opposite directions from one another to the heavy set magnitude MH.

In certain example embodiments, the first group of teeth may include the first tooth 110a, the second tooth 110b, the third tooth 110c, the fourth tooth 110d, and the fifth tooth 110e, the second group of teeth may include the sixth tooth 110f, the seventh tooth 110g, and the eighth tooth 110h, and the third group of teeth may include the ninth tooth 110i, the tenth tooth 110j, the eleventh tooth 110k, the twelfth tooth 110l, and the thirteenth tooth 110m. As shown, the first tooth 110a may be an unset tooth (S), the second tooth 110b may be offset a light magnitude to a right side of the blade body 101 (RL), the third tooth 110c may be offset a light magnitude to a left side of the blade body 101 (LL), the fourth tooth 110d may be offset a heavy magnitude to the right side of the blade body 101 (RH), the fifth tooth 110e may be offset a heavy magnitude to the left side of the blade body 101 (LH), the sixth tooth 110f may be an unset tooth (S), the seventh tooth 110g may be offset a heavy magnitude to the right side of the blade body 101 (RH), the eighth tooth 110h may be offset a heavy magnitude to the left side of the blade body 101 (LH), the ninth tooth 110i may be an unset tooth (S), the tenth tooth 110j may be offset a light magnitude to the right side of the blade body 101 (RL), the eleventh tooth 110k may be offset a light magnitude to the left side of the blade body 101 (LL), the twelfth tooth 110l may be offset a heavy magnitude to the right side of the blade body 101 (RH), and the thirteenth tooth 110m may be offset a heavy magnitude to the left side of the blade body 101 (LH).

As shown in FIG. 1F, the plurality of teeth 110 may define a kerf width K, as determined by the heavy set magnitude MH and a width W (i.e., thickness) of the unset tooth 110. In particular, the kerf width K may be an overall maximum width of the saw blade 100 after setting of the teeth 110 and may be determined according to the equation kerf width=width of unset tooth+(2×heavy set magnitude). In certain example embodiments, the kerf width K may be within a range of between approximately 0.115 inches to approximately 0.140 inches. In certain example embodiments, the kerf width K may be within a range of between approximately 0.120 inches to approximately 0.135 inches. In certain example embodiments, the kerf width K may be approximately 0.115 inches, approximately 0.120 inches, approximately 0.125 inches, approximately 0.130 inches, or approximately 0.140 inches. In certain example embodiments, the width W of the unset tooth 110 may be within a range of between approximately 0.040 inches and approximately 0.065 inches. In certain example embodiments, the width W may be approximately 0.042 inches, approximately 0.050 inches, or approximately 0.063 inches. In certain example embodiments, the heavy set magnitude MH may be within a range of between approximately 0.020 inches and approximately 0.040 inches. In certain example embodiments, the heavy set magnitude MH may be approximately 0.025 inches, approximately 0.029 inches, approximately 0.031 inches, approximately 0.034 inches, or approximately 0.039 inches.

FIGS. 1G and 1H illustrate a second multi-level set pattern in accordance with one or more embodiments of the disclosure. As shown, the second multi-level set pattern may be a five/three/five set pattern defined by a first group of five consecutive teeth 110, a second group of three consecutive teeth 110, and a third group of five consecutive teeth 110. The first group of teeth may include, with respect to the cutting direction A, a first unset tooth (i.e., a "straight" or "raker" tooth), a first light set tooth formed adjacent the first unset tooth in a direction opposite the cutting direction A and set to a light set magnitude ML, a first pair of consecutive heavy set teeth formed adjacent the first light set tooth in the direction opposite the cutting direction A and set to opposite sides of the blade body 101 from one another to a heavy set magnitude MH that is greater than the light set magnitude ML, and a second light set tooth formed adjacent the first pair of consecutive heavy set teeth in the direction opposite the cutting direction A and set to the light set magnitude ML. The second group of teeth may include, a second unset tooth formed adjacent the second light set tooth in the direction opposite the cutting direction A, and a second pair of consecutive heavy set teeth formed adjacent the second unset tooth in the direction opposite the cutting direction A and set to opposite sides of the blade body 101 from one another to the heavy set magnitude MH. The third group of teeth may include, a third unset tooth formed adjacent the second pair of consecutive heavy set teeth in the direction opposite the cutting direction A, a third light set tooth formed adjacent the third unset tooth in a direction opposite the cutting direction A and set to the light set magnitude ML, a third pair of consecutive heavy set teeth formed adjacent the third light set tooth in the direction opposite the cutting direction A and set to opposite sides of the blade body 101 from one another to the heavy set magnitude MH, and a fourth light set tooth formed adjacent the third pair of consecutive heavy set teeth in the direction opposite the cutting direction A and set to the light set magnitude ML.

In certain example embodiments, the first group of teeth may include the first tooth 110a, the second tooth 110b, the third tooth 110c, the fourth tooth 110d, and the fifth tooth 110e, the second group of teeth may include the sixth tooth 110f, the seventh tooth 110g, and the eighth tooth 110h, and the third group of teeth may include the ninth tooth 110i, the tenth tooth 110j, the eleventh tooth 110k, the twelfth tooth 110l, and the thirteenth tooth 110m. As shown, the first tooth 110a may be an unset tooth (S), the second tooth 110b may be offset a light magnitude to a right side of the blade body 101 (RL), the third tooth 110c may be offset a heavy magnitude to a left side of the blade body 101 (LH), the fourth tooth 110d may be offset a heavy magnitude to the right side of the blade body 101 (RH), the fifth tooth 110e may be offset a light magnitude to the left side of the blade body 101 (LL), the sixth tooth 110f may be an unset tooth (S), the seventh tooth 110g may be offset a heavy magnitude to the left side of the blade body 101 (LH), the eighth tooth 110h may be offset a heavy magnitude to the right side of the blade body 101 (RH), the ninth tooth 110i may be an unset tooth (S), the tenth tooth 110j may be offset a light magnitude to the right side of the blade body 101 (RL), the eleventh tooth 110k may be offset a heavy magnitude to the left side of the blade body 101 (LH), the twelfth tooth 110l may be offset a heavy magnitude to the right side of the blade body 101 (RH), and the thirteenth tooth 110m may be offset a light magnitude to the left side of the blade body 101 (LL).

As shown in FIG. 1H, the plurality of teeth 110 may define a kerf width K, as determined by the heavy set magnitude MH and a width W (i.e., thickness) of the unset tooth 110. In particular, the kerf width K may be an overall maximum width of the saw blade 100 after setting of the teeth 110 and may be determined according to the equation kerf width=width of unset tooth+(2×heavy set magnitude). In certain example embodiments, the kerf width K may be within a range of between approximately 0.115 inches to approximately 0.140 inches. In certain example embodiments, the kerf width K may be within a range of between approximately 0.120 inches to approximately 0.135 inches. In certain example embodiments, the kerf width K may be approximately 0.115 inches, approximately 0.120 inches, approximately 0.125 inches, approximately 0.130 inches, or approximately 0.140 inches. In certain example embodiments, the width W of the unset tooth 110 may be within a range of between approximately 0.040 inches and approximately 0.065 inches. In certain example embodiments, the width W may be approximately 0.042 inches, approximately 0.050 inches, or approximately 0.063 inches. In certain example embodiments, the heavy set magnitude MH may be within a range of between approximately 0.020 inches and approximately 0.040 inches. In certain example embodiments, the heavy set magnitude MH may be approximately 0.025 inches, approximately 0.029 inches, approximately 0.031 inches, approximately 0.034 inches, or approximately 0.039 inches.

In other example embodiments, the plurality of teeth 110 may define a single-level set pattern. FIGS. 1I and 1J illustrate a single-level set pattern in accordance with one or more embodiments of the disclosure. As shown, the single-level set pattern may be a five/three/five set pattern defined by a first group of five consecutive teeth 110, a second group of three consecutive teeth 110, and a third group of five consecutive teeth 110. The first group of teeth may include, with respect to the cutting direction A, a first unset tooth (i.e., a "straight" or "raker" tooth), a first pair of consecutive set teeth formed adjacent the first unset tooth in a direction opposite the cutting direction A and set to opposite sides of the blade body 101 from one another to a set magnitude M, and a second pair of consecutive set teeth formed adjacent the first pair of consecutive set teeth in the direction opposite the cutting direction A and set to opposite sides of the blade body 101 from one another to the set magnitude M. The second group of teeth may include a second unset tooth formed adjacent the second pair of consecutive set teeth in the direction opposite the cutting direction A, and a third pair of consecutive set teeth formed adjacent the second unset tooth in the direction opposite the cutting direction A and set to opposite sides of the blade body 101 from one another to the set magnitude M. The third group of teeth may include a third unset tooth formed adjacent the third pair of consecutive set teeth in the direction opposite the cutting direction A, a fourth pair of consecutive set teeth formed adjacent the third unset tooth in the direction opposite the cutting direction A and set to opposite sides of the blade body 101 from one another to the set magnitude M, and a fifth pair of consecutive set teeth formed adjacent the fourth pair of consecutive set teeth in the direction opposite the cutting direction A and set to opposite sides of the blade body 101 from one another to the set magnitude M.

In certain example embodiments, the first group of teeth may include the first tooth 110a, the second tooth 110b, the third tooth 110c, the fourth tooth 110d, and the fifth tooth 110e, the second group of teeth may include the sixth tooth 110f, the seventh tooth 110g, and the eighth tooth 110h, and the third group of teeth may include the ninth tooth 110i, the tenth tooth 110j, the eleventh tooth 110k, the twelfth tooth 110l, and the thirteenth tooth 110m. As shown, the first tooth 110a may be an unset tooth (S), the second tooth 110b may be offset a magnitude to a right side of the blade body 101 (R), the third tooth 110c may be offset a magnitude to a left side of the blade body 101 (L), the fourth tooth 110d may be offset a magnitude to the right side of the blade body 101 (R), the fifth tooth 110e may be offset a magnitude to the left side of the blade body 101 (L), the sixth tooth 110f may be an unset tooth (S), the seventh tooth 110g may be offset a magnitude to the right side of the blade body 101 (R), the eighth tooth 110h may be offset a magnitude to the left side of the blade body 101 (L), the ninth tooth 110i may be an unset tooth (S), the tenth tooth 110j may be offset a magnitude to the right side of the blade body 101 (R), the eleventh tooth 110k may be offset a magnitude to the left side of the blade body 101 (L), the twelfth tooth 110l may be offset a magnitude to the right side of the blade body 101 (R), and the thirteenth tooth 110m may be offset a magnitude to the left side of the blade body 101 (L).

As shown in FIG. 1J, the plurality of teeth 110 may define a kerf width K, as determined by the set magnitude M and a width W (i.e., thickness) of the unset tooth 110. In particular, the kerf width K may be an overall maximum width of the saw blade 100 after setting of the teeth 110 and may be determined according to the equation kerf width=width of unset tooth+(2×set magnitude). In certain example embodiments, the kerf width K may be within a range of between approximately 0.115 inches to approximately 0.140 inches. In certain example embodiments, the kerf width K may be within a range of between approximately 0.120 inches to approximately 0.135 inches. In certain example embodiments, the kerf width K may be approximately 0.115 inches, approximately 0.120 inches, approximately 0.125 inches, approximately 0.130 inches, or approximately 0.140 inches. In certain example embodiments, the width W of the unset tooth 110 may be within a range of between approximately 0.040 inches and approximately 0.065 inches. In certain example embodiments, the width W may be approximately 0.042 inches, approximately 0.050 inches, or approximately 0.063 inches. In certain example embodiments, the set magnitude M may be within a range of between approximately 0.020 inches and approximately 0.040 inches. In certain example embodiments, the set magnitude M may be approximately 0.025 inches, approximately 0.029 inches, approximately 0.031 inches, approximately 0.034 inches, or approximately 0.039 inches.

FIGS. 2A-2J illustrate a band saw blade 200 (which also may be referred to as a "structural band saw blade," a "saw blade," or a "blade") as well as individual components and features of the band saw blade 200 in accordance with one or more example embodiments of the disclosure. The band saw blade 200 may be used with a band saw machine for cutting large structural workpieces. The band saw blade 200 generally may be configured in a manner similar to the band saw blade 100 (similar features are indicated by corresponding reference numbers beginning with "2" instead of "1"), although certain differences between the saw blade 200 and the saw blade 100 are described below. In particular, the band saw blade 200 may have a different pitch pattern and a different set pattern than the band saw blade 100.

Figure 2A:
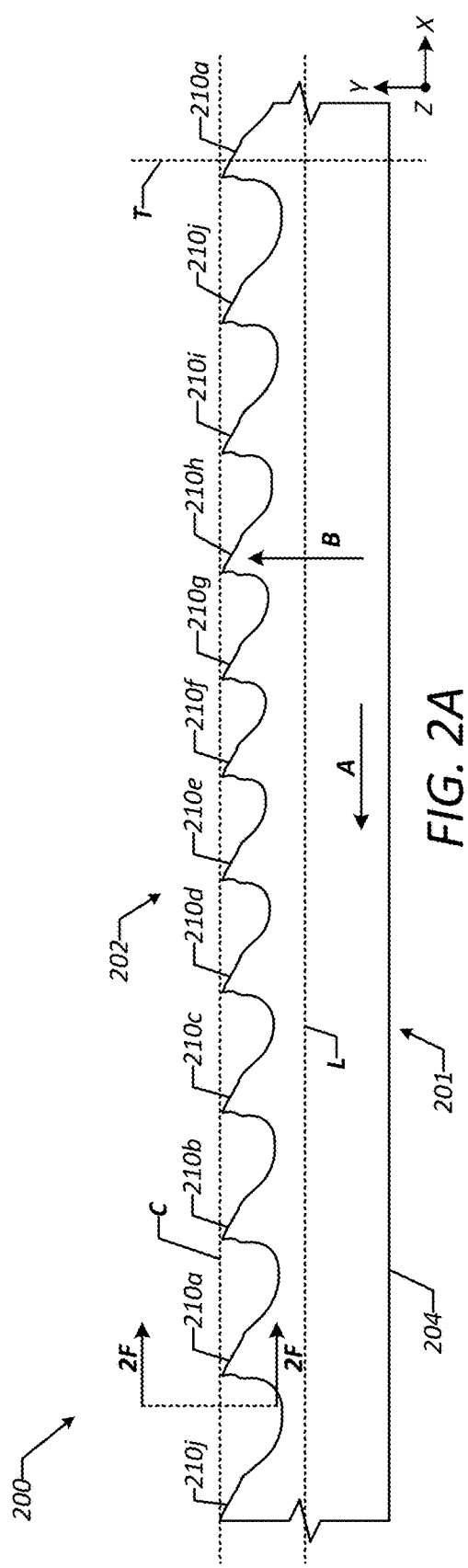
FIG. 2A is a side view of a portion of a band saw blade in accordance with one or more embodiments of the disclosure.

As shown in FIG. 2A, the band saw blade 200 may include a blade body 201 having a cutting edge 202 configured to engage and cut a workpiece, and a back edge 204 configured to engage spaced rollers of the band saw machine. The band saw blade 200 may define a cutting direction A and a feed direction B. The cutting edge 202 may include a plurality of teeth 210 spaced relative to one another along the band saw blade 200. In certain example embodiments, as shown, the plurality of teeth 210 may include a plurality of recurrent or repetitive patterns of the teeth 210 defining a 10-tooth pitch pattern. Each pitch pattern may be defined by a recurrent group of ten teeth 210, including a first tooth 210a, a second tooth 210b, a third tooth 210c, a fourth tooth 210d, a fifth tooth 210e, a sixth tooth 210f, a seventh tooth 210g, an eighth tooth 210h, a ninth tooth 210i, and a tenth tooth 210j. The cutting edge 202 may define a cutting plane C extending through the tips of the teeth 210 (prior to setting) or through the tips of the unset teeth 210 (after setting). As shown, the band saw blade 200 may have a longitudinal axis L extending parallel to the cutting plane C and parallel to the back edge 204, and a transverse axis T extending perpendicular to the cutting plane C and the longitudinal axis L.

Figure 2B:
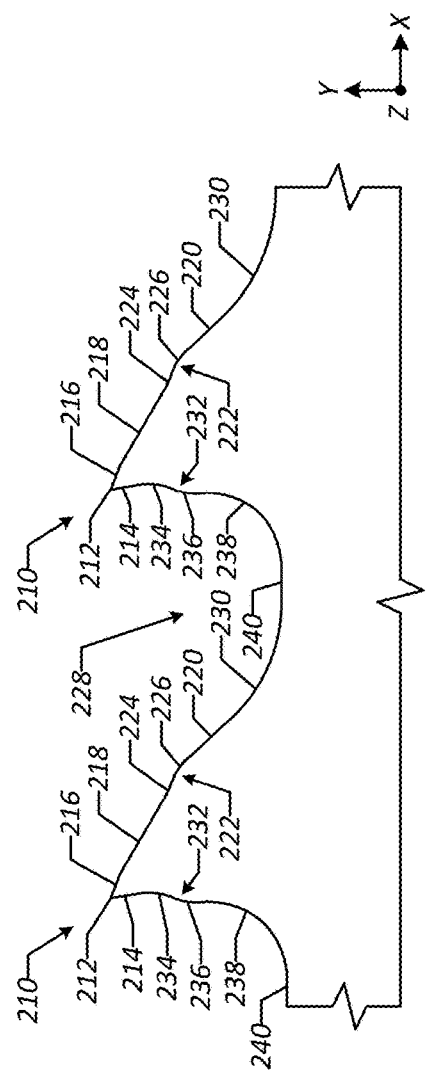
FIG. 2B is a detailed side view of a portion of the band saw blade of FIG. 2A, illustrating a typical tooth configuration of the band saw blade.
Figure 2C:
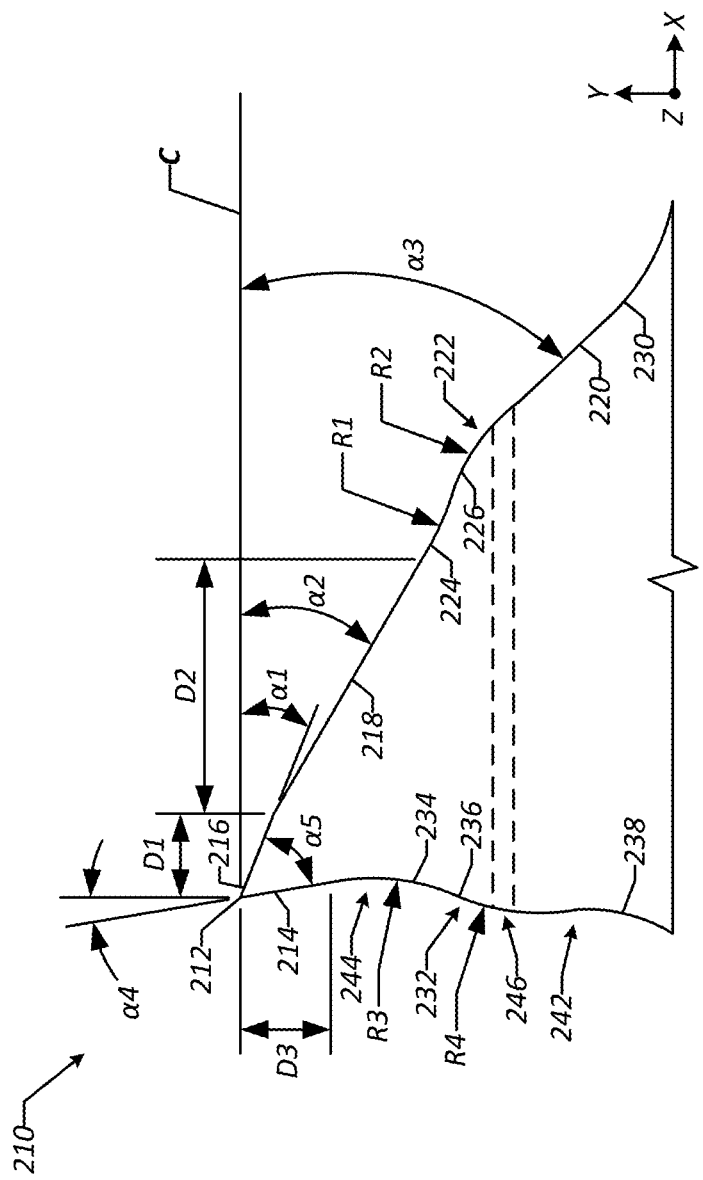
FIG. 2C is a detailed side view of a portion of the band saw blade of FIG. 2A, illustrating a typical tooth configuration of the band saw blade.

The teeth 210 may have a tooth form as illustrated in detail in FIGS. 2B and 2C for a typical tooth 210. As shown, each tooth 210 may include a tip 212, a rake face 214 formed on one side of the tip 212, and a primary clearance surface 216 formed on an opposite side of the tip 212 relative to the rake face 214. In this manner, the tip 212 may be defined by the intersection of the rake face 214 and the primary clearance surface 216. As shown, the primary clearance surface 216 may be formed as a planar surface defining a primary relief angle $\alpha 1$ relative to the cutting plane C or the back edge 204. Each tooth 210 also may include a secondary clearance surface 218 formed on an opposite side of the primary clearance surface 216 relative to the tip 212. As shown, the secondary clearance surface 218 may be formed as a planar surface defining a secondary relief angle $\alpha 2$ relative to the cutting plane C or the back edge 204. Each tooth 210 also may include a tertiary clearance surface 220 formed on an opposite side of the secondary clearance surface 218 relative to the primary clearance surface 216. As shown, the tertiary clearance surface 220 may be formed as a planar surface defining a tertiary relief angle $\alpha 3$ relative to the cutting plane C or the back edge 204. Each tooth 210 further may include a first protrusion 222 (which also may be referred to as a "relief face protrusion") formed between the secondary clearance surface 218 and the tertiary clearance surface 220. The first protrusion 222 may have a curvilinear shape and may be defined by a concave surface 224 and a convex surface 226. As shown, the primary clearance surface 216 may extend from the tip 212 to the secondary clearance surface 218, the secondary clearance surface 218 may extend from the primary clearance surface 216 to the concave surface 224, the concave surface 224 may extend from the secondary clearance surface 218 to the convex surface 226, and the convex surface 226 may extend from the concave surface 224 to the tertiary clearance surface 220. The tertiary clearance surface 220 may extend from the convex surface 226 to a first concave gullet surface 230 of a gullet 228 defined by the tooth 210.

As shown in FIG. 2C, the secondary relief angle $\alpha 2$ may be greater than the primary relief angle $\alpha 1$, and the tertiary relief angle $\alpha 3$ may be greater than the secondary relief angle $\alpha 2$. In certain example embodiments, the primary relief angle $\alpha 1$ may be within a range of between approximately 18 degrees to approximately 22 degrees. In certain example embodiments, the primary relief angle $\alpha 1$ may be approximately 20 degrees. In certain example embodiments, the secondary relief angle $\alpha 2$ may be within a range of between approximately 30 degrees to approximately 35 degrees. In certain example embodiments, the secondary relief angle $\alpha 2$ may be approximately 30 degrees. In certain example embodiments, the tertiary relief angle $\alpha 3$ may be within a range of between approximately 40 degrees to approximately 55 degrees. In certain example embodiments, the tertiary relief angle $\alpha 3$ may be approximately 45 degrees. As shown in FIG. 2C, the primary clearance surface 216 may have a first length D1 in the cutting direction A, and the secondary clearance surface 218 may have a second length D2 in the cutting direction A. The second length D2 may be greater than the first length D1, as shown. In certain example embodiments, the first length D1 may be within a range of between approximately 0.010 inches to approximately 0.030 inches. In certain example embodiments, the first length D1 may be approximately 0.020 inches.

As shown in FIG. 2C, the concave surface 224 of the first protrusion 222 may have a first radius R1, and the convex surface 226 of the first protrusion 222 may have a second radius R2. The first radius R1 may be different from the second radius R2, as shown. In certain example embodiments, the first radius R1 may be within a range of between approximately 0.125 inches to approximately 0.175 inches, and the second radius R2 may be within a range of between approximately 0.075 inches to approximately 0.125 inches. In certain example embodiments, the first radius R1 may be approximately 0.150 inches, and the second radius R2 may be approximately 0.100 inches.

As shown in FIG. 2C, the rake face 214 may be formed as a planar surface defining a rake angle $\alpha 4$ relative to a plane extending perpendicular to the cutting plane C or the back edge 204. In this manner, the rake face 214 and the primary clearance surface 216 may define an included tip angle $\alpha 5$ therebetween. Each tooth also may include a second protrusion 232 (which also may be referred to as a "rake face protrusion") formed between the rake face 214 and a second concave gullet surface 238 of the gullet 228. The second protrusion 232 may have a curvilinear shape and may be defined by a concave surface 234 and a convex surface 236. As shown, the rake face 214 may extend from the tip 212 to the concave surface 234, the concave surface 234 may extend from the rake face 214 to the convex surface 236, and the convex surface 236 may extend from the concave surface 234 to the second concave gullet surface 238. For some of the gullets 228 of the cutting edge 202, a planar gullet surface 240 may extend from the second concave gullet surface 238 to the first concave gullet surface 230, as shown in FIG. 2B. The planar gullet surface 240 may extend parallel or substantially parallel to the cutting plane C or the back edge 204. For other gullets 228 of the cutting edge 202, the second concave gullet surface 238 may extend to the first concave gullet surface 230.

In certain example embodiments, the rake angle $\alpha 4$ may be within a range of between approximately 8 degrees to approximately 12 degrees. In certain example embodiments, the rake angle $\alpha 4$ may be approximately 10 degrees. In certain example embodiments, the included tip angle $\alpha 5$ may be within a range of between approximately 56 degrees to approximately 64 degrees. In certain example embodiments, the included tip angle $\alpha 5$ may be approximately 60 degrees. As shown in FIG. 2C, the rake face 214 may have a height D3 in the direction perpendicular to the cutting plane C or the back edge 204. In certain example embodiments, the height D3 may be within a range of between approximately 0.013 inches to approximately 0.033 inches. In certain example embodiments, the height D3 may be approximately 0.023 inches. As shown in FIG. 2C, the concave surface 234 of the second protrusion 232 may have a third radius R3, and the convex surface 236 of the second protrusion 232 may have a fourth radius R4. The third radius R3 may be equal to or approximately equal to the fourth radius R4, as shown. In certain example embodiments, the third radius R3 and the fourth radius R4 may be within a range of between approximately 0.040 inches to approximately 0.080 inches. In certain example embodiments, the third radius R3 and the fourth radius R4 may be approximately 0.060 inches.

The band saw blade 200 may have a bi-metal configuration, including a backing formed of a first metal and a plurality of tips formed of a second metal and welded to the backing. In this manner, each tooth 210 may include a base portion 242 formed of the first metal, a tip portion 244 formed of the second metal, and a weld zone 246 (indicated by dashed lines) extending along the interface of the base portion 242 and the tip portion 244, as shown in FIG. 2C. In certain example embodiments, the weld zone 246 may extend parallel or substantially parallel to the cutting plane C of the saw blade 200. As shown, the first protrusion 222 may extend over a first end of the weld zone 246, and the second protrusion 232 may extend over an opposite second end of the weld zone 246. In this manner, the first protrusion 222 and the second protrusion 232 may provide the tooth 210 with enhanced strength along the weld zone 246 to inhibit stripping of the tooth 210. In certain example embodiments, the first metal may be a spring steel, and the second metal may be a tool steel.

As shown in FIG. 2D, the plurality of teeth 210 may be spaced at varying pitch distances between adjacent teeth 210, with each tooth 210 having a particular pitch distance or tooth spacing P between that tooth 210 and the following adjacent tooth 210 in the direction opposite the cutting direction A. The pitch distance P may be measured between the tips 212 of adjacent teeth 210, as shown, or between any of numerous other corresponding points between adjacent teeth 210. As shown, the plurality of teeth 210 may define a 10-tooth pitch pattern. In this manner, for the group of ten teeth 210, a first pitch distance P1 may be defined between the first tooth 210a and the second tooth 210b, a second pitch distance P2 may be defined between the second tooth 210b and the third tooth 210c, a third pitch distance P3 may be defined between the third tooth 210c and the fourth tooth 210d, a fourth pitch distance P4 may be defined between the fourth tooth 210d and the fifth tooth 210e, a fifth pitch distance P5 may be defined between the fifth tooth 210e and the sixth tooth 210f, a sixth pitch distance P6 may be defined between the sixth tooth 210f and the seventh tooth 210g, a seventh pitch distance P7 may be defined between the seventh tooth 210g and the eighth tooth 210h, an eighth pitch distance P8 may be defined between the eighth tooth 210h and the ninth tooth 210i, a ninth pitch distance P9 may be defined between the ninth tooth 210i and the tenth tooth 210j, and a tenth pitch distance P10 may be defined between the tenth tooth 210j and the first tooth 210a of the next group of teeth 210.

The variable pitch pattern of the teeth 210 may include a minimum pitch distance between a first pair of adjacent teeth 210 and a maximum pitch distance between a second pair of adjacent teeth 210. In certain example embodiments, as shown, the sixth pitch distance P6 may be the minimum pitch distance, and the tenth pitch distance P10 may be the maximum pitch distance. Based on the known pitch distance for a pair of adjacent teeth 120 in the pitch pattern, the teeth per inch (TPI) may be determined for that portion of the pitch pattern according to the equation TPI=(1/(pitch distance)). The minimum pitch distance of the pitch pattern may correspond to a maximum TPI of the pitch pattern, and the maximum pitch distance of the pitch pattern may correspond to a minimum TPI of the pitch pattern. In certain example embodiments, a difference between the minimum TPI based on the maximum pitch distance of the pitch pattern and the maximum TPI based on the minimum pitch distance of the pitch pattern may be equal to or greater than 1. In certain example embodiments, the difference between the minimum TPI based on the maximum pitch distance of the pitch pattern and the maximum TPI based on the minimum pitch distance of the pitch pattern may be equal to 1. In certain example embodiments, the variable pitch pattern may define a 2/3 pitch pattern. In other words, the minimum TPI based on the maximum pitch distance of the pitch pattern may be 2, and the maximum TPI based on the minimum pitch distance of the pitch pattern may be 3. In this manner, the minimum pitch distance of the pitch pattern may be 0.333 inches, and the maximum pitch distance of the pitch pattern may be 0.500 inches. In certain example embodiments, the first pitch distance P1 may be 0.472 inches, the second pitch distance P2 may be 0.444 inches, the third pitch distance P3 may be 0.418 inches, the fourth pitch distance P4 may be 0.390 inches, the fifth pitch distance P5 may be 0.362 inches, the sixth pitch distance P6 may be 0.333 inches, the seventh pitch distance P7 may be 0.375 inches, the eighth pitch distance P8 may be 0.415 inches, the ninth pitch distance P9 may be 0.457 inches, and the tenth pitch distance P10 may be 0.500 inches. In certain example embodiments, an overall length OL of the group of ten teeth 210 may be 4.166 inches. In certain example embodiments, the variable pitch pattern may define a 3/4 pitch pattern. In other words, the minimum TPI based on the maximum pitch distance of the pitch pattern may be 3, and the maximum TPI based on the minimum pitch distance of the pitch pattern may be 4. In this manner, the minimum pitch distance of the pitch pattern may be 0.250 inches, and the maximum pitch distance of the pitch pattern may be 0.333 inches. In certain example embodiments, a difference between the minimum TPI based on the maximum pitch distance of the pitch pattern and the maximum TPI based on the minimum pitch distance of the pitch pattern may be equal to or greater than 2. In certain example embodiments, the difference between the minimum TPI based on the maximum pitch distance of the pitch pattern and the maximum TPI based on the minimum pitch distance of the pitch pattern may be equal to 2. In certain example embodiments, the variable pitch pattern may define a 4/6 pitch pattern. In other words, the minimum TPI based on the maximum pitch distance of the pitch pattern may be 4, and the maximum TPI based on the minimum pitch distance of the pitch pattern may be 6. In this manner, the minimum pitch distance of the pitch pattern may be 0.167 inches, and the maximum pitch distance of the pitch pattern may be 0.250 inches.

In certain example embodiments, the plurality of teeth 210 may define a multi-level set pattern. FIGS. 2E and 2F illustrate a first multi-level set pattern in accordance with one or more embodiments of the disclosure. As shown, the first multi-level set pattern may be a five/five set pattern defined by a first group of five consecutive teeth 210 and a second group of five consecutive teeth 210. The first group of teeth may include, with respect to the cutting direction A, a first unset tooth (i.e., a "straight" or "raker" tooth), a first pair of consecutive light set teeth formed adjacent the first unset tooth in a direction opposite the cutting direction A and set to opposite sides of the blade body 101 from one another to a light set magnitude ML, and a first pair of consecutive heavy set teeth formed adjacent the first pair of consecutive light set teeth in the direction opposite the cutting direction A and set to opposite sides of the blade body 101 from one another to a heavy set magnitude MH that is greater than the light set magnitude ML. In a similar manner, the second group of teeth may include a second unset tooth formed adjacent the first pair of consecutive heavy set teeth in the direction opposite the cutting direction A, a second pair of consecutive light set teeth formed adjacent the second unset tooth in a direction opposite the cutting direction A and set to opposite sides of the blade body 101 from one another to the light set magnitude ML, and a second pair of consecutive heavy set teeth formed adjacent the second pair of consecutive light set teeth in the direction opposite the cutting direction A and set to opposite sides of the blade body 101 from one another to the heavy set magnitude MH.

In certain example embodiments, the first group of teeth may include the first tooth 210a, the second tooth 210b, the third tooth 210c, the fourth tooth 210d, and the fifth tooth 210e, and the second group of teeth may include the sixth tooth 210f, the seventh tooth 210g, the eighth tooth 210h, the ninth tooth 210i, and the tenth tooth 210j. As shown, the first tooth 210a may be an unset tooth (S), the second tooth 210b may be offset a light magnitude to a right side of the blade body 201 (RL), the third tooth 210c may be offset a light magnitude to a left side of the blade body 201 (LL), the fourth tooth 210d may be offset a heavy magnitude to the right side of the blade body 201 (RH), the fifth tooth 210e may be offset a heavy magnitude to the left side of the blade body 201 (LH), the sixth tooth 210f may be an unset tooth (S), the seventh tooth 210g may be offset a light magnitude to the right side of the blade body 201 (RL), the eighth tooth 210h may be offset a light magnitude to the left side of the blade body 201 (LL), the ninth tooth 210i may be offset a heavy magnitude to the right side of the blade body 201 (RH), and the tenth tooth 210j may be offset a heavy magnitude to the left side of the blade body 201 (LH).

As shown in FIG. 2F, the plurality of teeth 210 may define a kerf width K, as determined by the heavy set magnitude MH and a width W (i.e., thickness) of the unset tooth 210. In particular, the kerf width K may be an overall maximum width of the saw blade 200 after setting of the teeth 210 and may be determined according to the equation kerf width=width of unset tooth+(2×heavy set magnitude). In certain example embodiments, the kerf width K may be within a range of between approximately 0.085 inches to approximately 0.135 inches. In certain example embodiments, the kerf width K may be within a range of between approximately 0.090 inches to approximately 0.130 inches. In certain example embodiments, the kerf width K may be approximately 0.090 inches, approximately 0.100 inches, approximately 0.115 inches, approximately 0.120 inches, or approximately 0.130 inches. In certain example embodiments, the width W of the unset tooth 210 may be within a range of between approximately 0.040 inches and approximately 0.065 inches. In certain example embodiments, the width W may be approximately 0.042 inches, approximately 0.050 inches, or approximately 0.063 inches. In certain example embodiments, the heavy set magnitude MH may be within a range of between approximately 0.020 inches and approximately 0.040 inches. In certain example embodiments, the heavy set magnitude MH may be approximately 0.024 inches, approximately 0.025 inches, approximately 0.026 inches, or approximately 0.034 inches.

FIGS. 2G and 2H illustrate a second multi-level set pattern in accordance with one or more embodiments of the disclosure. As shown, the second multi-level set pattern may be a five/five set pattern defined by a first group of five consecutive teeth 210 and a second group of five consecutive teeth 210. The first group of teeth may include, with respect to the cutting direction A, a first unset tooth (i.e., a "straight" or "raker" tooth), a first light set tooth formed adjacent the first unset tooth in a direction opposite the cutting direction A and set to a light set magnitude ML, a first pair of consecutive heavy set teeth formed adjacent the first light set tooth in the direction opposite the cutting direction A and set to opposite sides of the blade body 201 from one another to a heavy set magnitude MH that is greater than the light set magnitude ML, and a second light set tooth formed adjacent the first pair of consecutive heavy set teeth in the direction opposite the cutting direction A and set to the light set magnitude ML. In a similar manner, the second group of teeth may include, a second unset tooth formed adjacent the second light set tooth in the direction opposite the cutting direction A, a third light set tooth formed adjacent the second unset tooth in a direction opposite the cutting direction A and set to the light set magnitude ML, a second pair of consecutive heavy set teeth formed adjacent the third light set tooth in the direction opposite the cutting direction A and set to opposite sides of the blade body 201 from one another to the heavy set magnitude MH, and a fourth light set tooth formed adjacent the second pair of consecutive heavy set teeth in the direction opposite the cutting direction A and set to the light set magnitude ML.

In certain example embodiments, the first group of teeth may include the first tooth 210a, the second tooth 210b, the third tooth 210c, the fourth tooth 210d, and the fifth tooth 210e, and the second group of teeth may include the sixth tooth 210f, the seventh tooth 210g, the eighth tooth 210h, the ninth tooth 210i, and the tenth tooth 210j. As shown, the first tooth 210a may be an unset tooth (S), the second tooth 210b may be offset a light magnitude to a right side of the blade body 201 (RL), the third tooth 210c may be offset a heavy magnitude to a left side of the blade body 201 (LH), the fourth tooth 210d may be offset a heavy magnitude to the right side of the blade body 201 (RH), the fifth tooth 210e may be offset a light magnitude to the left side of the blade body 201 (LL), the sixth tooth 210f may be an unset tooth (S), the seventh tooth 210g may be offset a light magnitude to the right side of the blade body 201 (RL), the eighth tooth 210h may be offset a heavy magnitude to the left side of the blade body 201 (LH), the ninth tooth 210i may be offset a heavy magnitude to the right side of the blade body 201 (RH), and the tenth tooth 210j may be offset a light magnitude to the left side of the blade body 201 (LL).

As shown in FIG. 2H, the plurality of teeth 210 may define a kerf width K, as determined by the heavy set magnitude MH and a width W (i.e., thickness) of the unset tooth 210. In particular, the kerf width K may be an overall maximum width of the saw blade 200 after setting of the teeth 210 and may be determined according to the equation kerf width=width of unset tooth+(2×heavy set magnitude). In certain example embodiments, the kerf width K may be within a range of between approximately 0.085 inches to approximately 0.135 inches. In certain example embodiments, the kerf width K may be within a range of between approximately 0.090 inches to approximately 0.130 inches. In certain example embodiments, the kerf width K may be approximately 0.090 inches, approximately 0.100 inches, approximately 0.115 inches, approximately 0.120 inches, or approximately 0.130 inches. In certain example embodiments, the width W of the unset tooth 210 may be within a range of between approximately 0.040 inches and approximately 0.065 inches. In certain example embodiments, the width W may be approximately 0.042 inches, approximately 0.050 inches, or approximately 0.063 inches. In certain example embodiments, the heavy set magnitude MH may be within a range of between approximately 0.020 inches and approximately 0.040 inches. In certain example embodiments, the heavy set magnitude MH may be approximately 0.024 inches, approximately 0.025 inches, approximately 0.026 inches, or approximately 0.034 inches.

In other example embodiments, the plurality of teeth 210 may define a single-level set pattern. FIGS. 2I and 2J illustrate a single-level set pattern in accordance with one or more embodiments of the disclosure. As shown, the single-level set pattern may be a five/five set pattern defined by a first group of five consecutive teeth 210 and a second group of five consecutive teeth 210. The first group of teeth may include, with respect to the cutting direction A, a first unset tooth (i.e., a "straight" or "raker" tooth), a first pair of consecutive set teeth formed adjacent the first unset tooth in a direction opposite the cutting direction A and set to opposite sides of the blade body 201 from one another to a set magnitude M, and a second pair of consecutive set teeth formed adjacent the first pair of consecutive set teeth in the direction opposite the cutting direction A and set to opposite sides of the blade body 201 from one another to the set magnitude M. In a similar manner, the second group of teeth may include a second unset tooth formed adjacent the second pair of consecutive set teeth in the direction opposite the cutting direction A, a third pair of consecutive set teeth formed adjacent the second unset tooth in the direction opposite the cutting direction A and set to opposite sides of the blade body 201 from one another to the set magnitude M, and a fourth pair of consecutive set teeth formed adjacent the third pair of consecutive set teeth in the direction opposite the cutting direction A and set to opposite sides of the blade body 201 from one another to the set magnitude M.

In certain example embodiments, the first group of teeth may include the first tooth 210a, the second tooth 210b, the third tooth 210c, the fourth tooth 210d, and the fifth tooth 210e, and the second group of teeth may include the sixth tooth 210f, the seventh tooth 210g, the eighth tooth 210h, the ninth tooth 210i, and the tenth tooth 210j. As shown, the first tooth 210a may be an unset tooth (S), the second tooth 210b may be offset a magnitude to a right side of the blade body 201 (R), the third tooth 210c may be offset a magnitude to a left side of the blade body 201 (L), the fourth tooth 210d may be offset a magnitude to the right side of the blade body 201 (R), the fifth tooth 210e may be offset a magnitude to the left side of the blade body 201 (L), the sixth tooth 210f may be an unset tooth (S), the seventh tooth 210g may be offset a magnitude to the right side of the blade body 201 (R), the eighth tooth 210h may be offset a magnitude to the left side of the blade body 201 (L), the ninth tooth 210i may be offset a magnitude to the right side of the blade body 201 (R), and the tenth tooth 210j may be offset a magnitude to the left side of the blade body 201 (L).

As shown in FIG. 2J, the plurality of teeth 210 may define a kerf width K, as determined by the set magnitude M and a width W (i.e., thickness) of the unset tooth 210. In particular, the kerf width K may be an overall maximum width of the saw blade 200 after setting of the teeth 210 and may be determined according to the equation kerf width=width of unset tooth+(2×set magnitude). In certain example embodiments, the kerf width K may be within a range of between approximately 0.085 inches to approximately 0.135 inches. In certain example embodiments, the kerf width K may be within a range of between approximately 0.090 inches to approximately 0.130 inches. In certain example embodiments, the kerf width K may be approximately 0.090 inches, approximately 0.100 inches, approximately 0.115 inches, approximately 0.120 inches, or approximately 0.130 inches. In certain example embodiments, the width W of the unset tooth 210 may be within a range of between approximately 0.040 inches and approximately 0.065 inches. In certain example embodiments, the width W may be approximately 0.042 inches, approximately 0.050 inches, or approximately 0.063 inches. In certain example embodiments, the set magnitude M may be within a range of between approximately 0.020 inches and approximately 0.040 inches. In certain example embodiments, the set magnitude M may be approximately 0.024 inches, approximately 0.025 inches, approximately 0.026 inches, or approximately 0.034 inches.

The band saw blade 100 and the band saw blade 200 may be particularly suitable for cutting large structural workpieces. As compared to cutting solid workpieces, the cutting of large structural workpieces tends to be more abusive to the teeth of a band saw blade. Although the materials of large structural workpieces generally may be softer than those used in aerospace and other applications, the cutting of structural members typically occurs at higher feeds and band speeds. Moreover, due to the shapes of large structural workpieces, each individual tooth of the band saw blade may experience multiple "entrances" into and multiple "exits" out of the workpiece during a single revolution of the saw blade, and the length(s) of tooth engagement may change significantly as the saw blade advances through the workpiece in the feed direction.

Figure 3A:
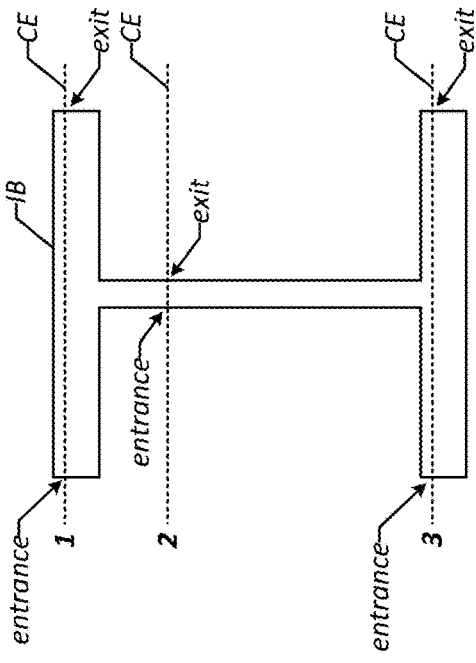
FIG. 3A is a schematic end view illustrating a cutting edge of a canted band saw blade advancing through a solid workpiece.

FIG. 3A illustrates a cutting edge CE of a band saw blade at multiple positions of advancement through a solid round workpiece SR. Although the length of tooth engagement may increase as the band saw blade moves from a first position 1 to a second position 2 and may decrease as the saw blade moves from the second position 2 to a third position 3, the saw blade may be configured such that a desired number of teeth (e.g., between 3 and 24 teeth, and preferably, between 9 and 12 teeth for efficient cutting) engage the workpiece at all times throughout the cut. Further, when cutting the solid round workpiece SR, each individual tooth of the saw blade may experience only a single entrance and a single exit per blade revolution. In this manner, during a revolution of the band saw blade, each tooth may experience a single "shock" (i.e., an abrupt loading) at the entrance, followed by a "flex" (i.e., the work of producing a chip in the workpiece), and then a "release" at the exit.

Figure 3B:
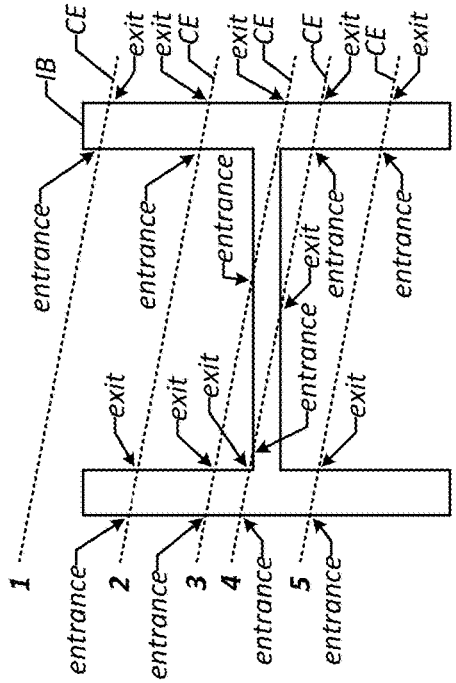
FIG. 3B is a schematic end view illustrating a cutting edge of a horizontal band saw blade advancing through an I-beam in a first orientation.
Figure 3C:
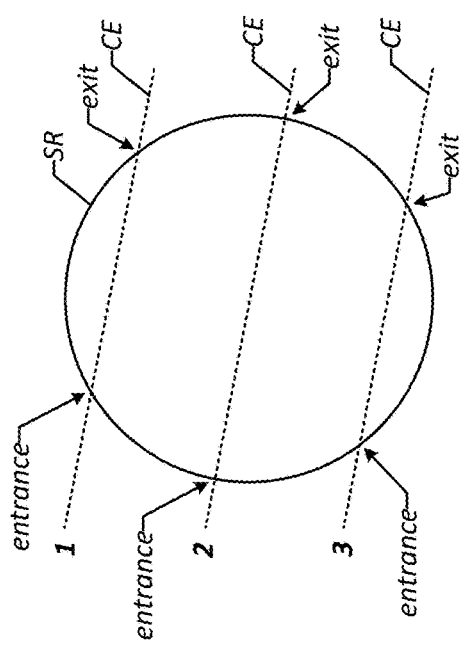
FIG. 3C is a schematic end view illustrating a cutting edge of a horizontal band saw blade advancing through an I-beam in a second orientation.
Figure 3D:
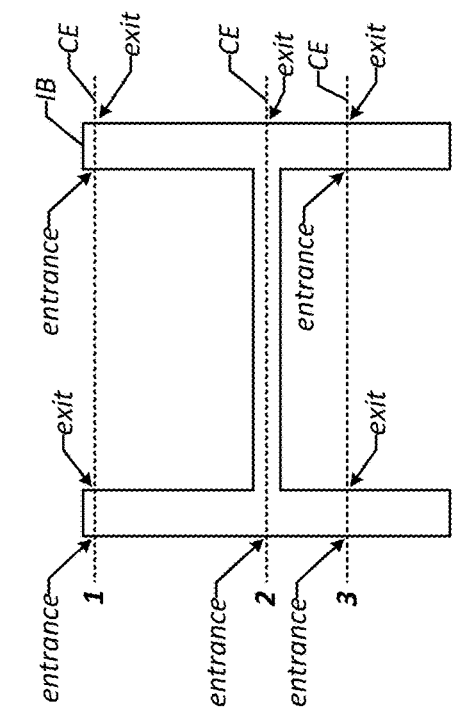
FIG. 3D is a schematic end view illustrating a cutting edge of a canted band saw blade advancing through an I-beam in the second orientation.

FIGS. 3B-3D illustrate a cutting edge CE of a band saw blade at multiple positions of advancement through an I-beam IB. When the web of the I-beam IB is in a vertical orientation, as shown in FIG. 3B, each tooth of the band saw blade may experience a single shock-flex-release cycle per revolution of the saw blade. However, the length of tooth engagement may change significantly as the saw blade advances through the I-beam IB, with the teeth engaging the entire length of one of the flanges at a first position 1, a thickness of the web at a second position 2, and the entire length of the other flange at a third position 3. Existing band saw blades may be unable to accommodate such a large variation in the length of tooth engagement. For example, when the band saw blade is at the first position 1 and the third position 3, more than 24 teeth may engage the I-beam IB, which may result in the cutting force being distributed so finely that the teeth are unable to penetrate the workpiece and produce a chip. Additionally, when the band saw blade is at the second position 2, fewer than 3 teeth may engage the I-beam IB, which may result in rough cut surface and may increase the likelihood of the teeth being stripped.

When the web of the I-beam IB is in a horizontal orientation, as shown in FIG. 3C, the length of tooth engagement also may change significantly as the saw blade advances through the I-beam IB, ranging from a length equal to the combined thickness of the flanges of the I-beam IB when the blade is at a first position 1 or a third position 3, to a length equal to the overall width of the I-beam IB when the blade is at a second position 2. Again, existing band saw blades may be unable to accommodate such a large variation in the length of tooth engagement. Moreover, each tooth of the band saw blade may experience multiple shock-flex-release cycles per revolution of the saw blade when the saw blade is at the first position 1 and the third position 3, which may increase the likelihood of the teeth being chipped at the shock portion of the cycle or being stripped at the flex-release portion of the cycle. When the band saw blade is oriented at a slight cant from horizontal (e.g., about 7 to 10 degrees), as shown in FIG. 3D, the maximum length of tooth engagement may be decreased. However, each tooth of the band saw blade still may experience multiple shock-flex-release cycles per revolution of the saw blade as the saw blade advances through the I-beam IB. In fact, when the band saw blade is at a fourth position 4, each tooth may experience three shock-flex-release cycles per revolution of the saw blade, significantly increasing the likelihood of chipped or stripped teeth.

Certain advantages of the band saw blade 100 and/or the band saw blade 200 in cutting large structural workpieces may be best appreciated by comparison to existing band saw blades. Some existing band saw blades may have a tooth form designed to increase the size of the tooth along the bi-metal weld interface. For example, certain existing band saw blades may include a primary clearance surface defining a relatively shallow primary relief angle (e.g., between 26 and 30 degrees), followed by a secondary clearance surface defining a shallower secondary relief angle (e.g., between 0 and 15 degrees), to provide more mass in the tooth tip and reduce the likelihood of the tooth being chipped. Although such saw blades generally may extend tooth and blade life in high-impact cutting applications, they may have a tendency to fail earlier by "crooked cutting." In other words, when the primary clearance surface is lost due to wear, the wear land may grow at a dramatic rate, reducing the ability of the teeth to penetrate the workpiece, and causing the saw blade to flex out of plane. Additionally, such saw blades generally may be less free cutting than those having more conventional tooth forms and may require longer cut times.

As described above, the tooth form of the band saw blade 100 and the band saw blade 200 may define a very shallow primary relief angle, followed by a steep secondary relief angle. For example, the primary relief angle may be within a range of between approximately 18 degrees to approximately 22 degrees, and the secondary relief angle may be within a range of between approximately 30 degrees to approximately 35 degrees. Additionally, the length of the primary clearance surface in the cutting direction may be relatively short, for example, within a range of between approximately 0.010 inches to approximately 0.030 inches. The configuration of the primary clearance surface of the disclosed tooth form advantageously may increase resistance to tooth damage while also minimizing the tendency toward early crooked cutting. Further, the configuration of the secondary clearance surface of the disclosed tooth form advantageously may further limit rapidly growing wear lands and early crooked cutting. As described above, the tooth form of the band saw blade 100 and the band saw blade 200 also may include a first protrusion positioned along the relief side of the tooth between the secondary clearance surface and the tertiary clearance surface and extending over a first end of the weld zone. The first protrusion advantageously may strengthen the tooth along the weld zone and inhibit the tooth from being stripped. Ultimately, the combination of the relief angles and the first protrusion of the tooth form of the band saw blade 100 and the band saw blade 200 may provide enhanced resistance to tooth damage due to multiple shock-flex-release cycles per blade revolution and the presence of localized hard spots as may be experienced in cutting large structural workpieces.

As described above, the tooth form of the band saw blade 100 and the band saw blade 200 also may include a second protrusion positioned along the rake side of the tooth adjacent the rake face and extending over a second end of the weld zone. The second protrusion may have a curvilinear shape defined by a concave surface having a first radius and a convex surface having a second radius. The second protrusion may provide multiple advantages. In particular, the second protrusion may function as a chip breaker, forcing a chip to curl away from the rake face of the tooth, thereby limiting damage to the rake face and limiting the maximum size of the chip before it breaks. Additionally, the second protrusion may strengthen the tooth along the weld zone and inhibit the tooth from being stripped. However, the second protrusion may interrupt chip flow into the gullet, which may increase required cut forces and potentially result in slower cutting.

Figure 4:
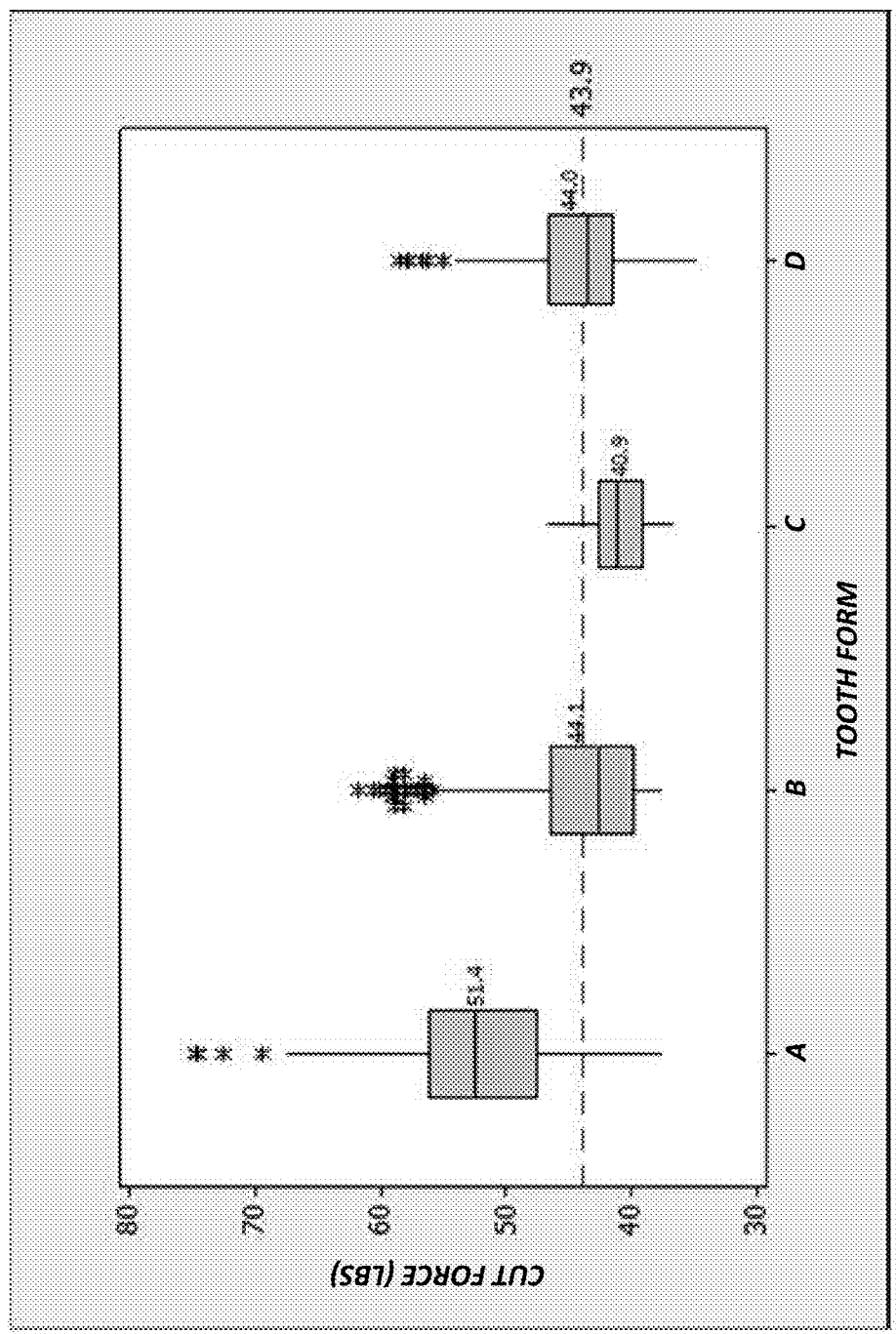
FIG. 4 is a graph of cut force (lbs) required for a number of different tooth forms having a protrusion positioned along the rake side of the tooth.

FIG. 4 shows a graph of cut force (lbs) required for different tooth forms having a protrusion positioned along the rake side of the tooth. Tooth forms A, B, and C each include a protrusion defined by a concave surface having a first radius and a convex surface having a second radius. For tooth form A, the first radius is 0.015 inches, and the second radius is 0.050 inches. For tooth form B, the first radius is 0.030 inches, and the second radius is 0.055 inches. For tooth form C, the first radius is 0.060 inches, and the second radius is 0.060 inches. Tooth form D includes a protrusion defined by a concave surface having a first radius and a planar surface. For tooth form D, the first radius is 0.060 inches. As shown, increasing the first radius of the concave surface defining the protrusion (i.e., smoothing the transition between the rake face and the protrusion) generally results in a decrease in the required cut force. According to conventional wisdom in the art, one would expect that the required cut force would decrease in a linear manner. However, as illustrated in FIG. 4, it was surprisingly discovered that the required cut force decreased in a non-linear manner, and that a minimum cut force was required for tooth form C having the first radius and the second radius of the protrusion equal to or approximately equal to one another at a value of 0.060 inches. In this manner, the second protrusion of the tooth form of the band saw blade 100 and the band saw blade 200 may provide enhanced strength along the weld zone and inhibit the tooth from being stripped, while also minimizing the effect of the second protrusion on cut forces and cut speeds.

As described above, the teeth of the band saw blade 100 and the band saw blade 200 may define a multi-level set pattern or a single-level set pattern having a heavier tooth set (i.e., an extra-wide kerf). In particular, the teeth may define a kerf width that is within a range of between approximately 0.115 inches and approximately 0.140 inches. The extra-wide kerf may produce enhanced clearance for the backing of the saw blade to pass through the workpiece, thereby minimizing occurrence of blade pinching due to stress relaxation in the workpiece. In effect, the stress relieved material would have to travel further into the cut in order to contact the backing of the saw blade. However, the extra-wide kerf may negatively impact cutting efficiency, time of cut, and life of the teeth.

Figure 5:
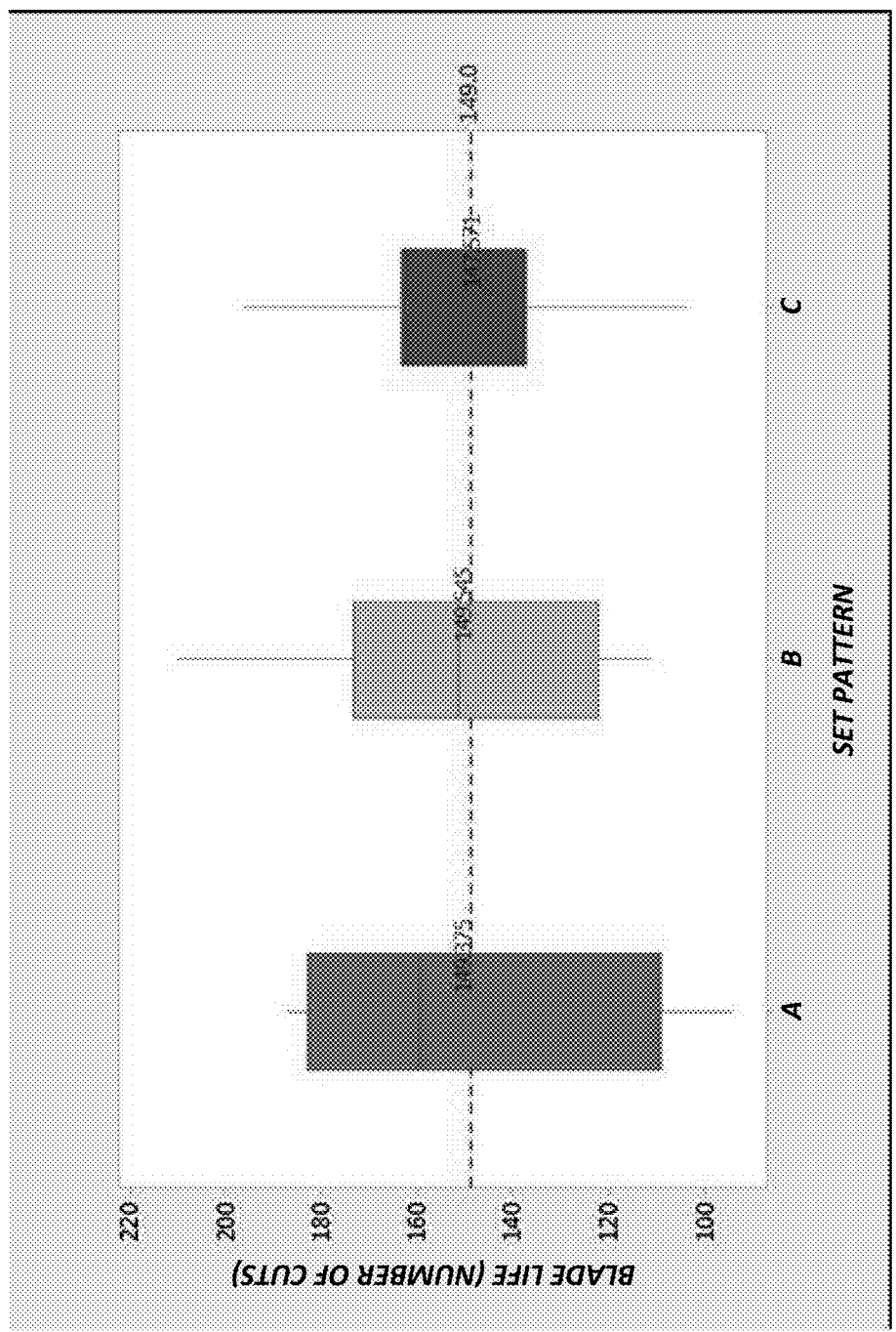
FIG. 5 is a graph of blade life (number of cuts) for a number of different set patterns having an extra-wide kerf.

FIG. 5 shows a graph of blade life (number of cuts) for different set patterns having an extra-wide kerf. Set pattern A corresponds to the single-level set pattern described above with respect to FIGS. 1I, 1J, 2I, and 2J. Set pattern B corresponds to the multi-level set pattern described above with respect to FIGS. 1G, 1H, 2G, and 2H. Set pattern C corresponds to the multi-level set pattern described above with respect to FIGS. 1E, 1F, 2E, and 2F. As shown in FIG. 5, the set patterns A, B, and C exhibited minimal differentiation in blade life, with each set pattern having an average blade life of about 150 cuts. However, set pattern C exhibited less variation among the saw blades tested.

As described above, in certain example embodiments, the teeth of the band saw blade 100 may define a 13-tooth pitch pattern having a maximum pitch distance that corresponds to a minimum TPI of 2 and a minimum pitch distance that corresponds to a maximum TPI of 4, and thus a difference between the minimum TPI and the maximum TPI may be equal to 2. In certain example embodiments, the teeth of the band saw blade 200 may define a 10-tooth pitch pattern having a maximum pitch distance that corresponds to a minimum TPI of 2 and a minimum pitch distance that corresponds to a maximum TPI of 3, and thus a difference between the minimum TPI and the maximum TPI may be equal to 1. In certain example embodiments, the teeth of the band saw blade 200 may define a 10-tooth pitch pattern having a maximum pitch distance that corresponds to a minimum TPI of 3 and a minimum pitch distance that corresponds to a maximum TPI of 4, and thus a difference between the minimum TPI and the maximum TPI may be equal to 1. In certain example embodiments, the teeth of the band saw blade 200 may define a 10-tooth pitch pattern having a maximum pitch distance that corresponds to a minimum TPI of 4 and a minimum pitch distance that corresponds to a maximum TPI of 6, and thus a difference between the minimum TPI and the maximum TPI may be equal to 2. As compared to embodiments of the band saw blades 100, 200 in which the difference between the minimum TPI and the maximum TPI is equal to 1, embodiments of the band saw blades 100, 200 in which the difference between the minimum TPI and the maximum TPI is equal to 2 may provide a wider variation of tooth spacing on a single blade and thus a wider span of tooth engagements where the saw blades 100, 200 may be useful. For reasons explained above, the wider variation of tooth spacing may be particularly advantageous for cutting large structural workpieces, such as I-beams, due to the significant changes in the length(s) of tooth engagement as the band saw blade advances through the workpiece, and thus such embodiments of the band saw blades 100, 200 may provide enhanced versatility in cutting various types of workpieces.

Figure 6:
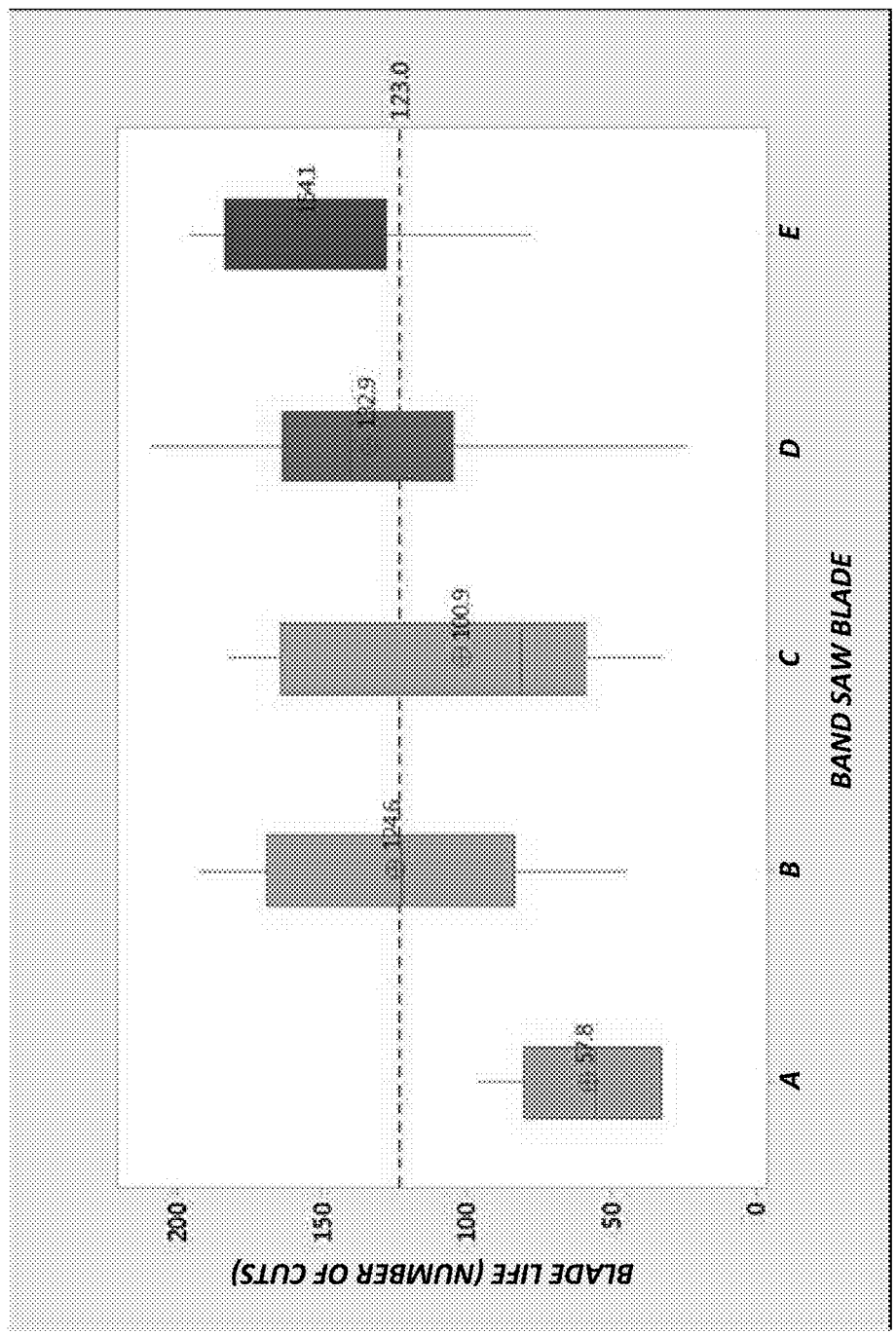
FIG. 6 is a graph of blade life (number of cuts) for a number of different band saw blades.

FIG. 6 shows a graph of blade life (number of cuts) for different band saw blades. Band saw blades A, B, and C correspond to three different existing band saw blades for cutting large structural workpieces. Band saw blade D corresponds to an embodiment of the band saw blade 200 having the tooth form, the 10-tooth ⅔ pitch pattern, the set pattern, and the extra-wide kerf described above with respect to FIGS. 2A-2F. Band saw blade E corresponds to an embodiment of the band saw blade 100 having the tooth form, the 13-tooth ¾ pitch pattern, the set pattern, and the extra-wide kerf described above with respect to FIGS. 1A-1F. With respect to the tooth form, the teeth of band saw blade D and band saw blade E each include: (i) the tip 112, 212; (ii) the rake face 114, 214 formed on one side of the tip 112, 212; (iii) the primary clearance surface 116, 216 formed on an opposite side of the tip 112, 212 relative to the rake face 114, 214 and defining the primary relief angle α1; (iv) the secondary clearance surface 118, 218 formed on an opposite side of the primary relief surface 116, 216 relative to the tip 112, 212 and defining the secondary relief angle α2 that is greater than the primary relief angle α1; (v) tertiary clearance surface 120, 220 formed on an opposite side of the secondary clearance surface 118, 218 relative to the primary clearance surface 116, 216 and defining the tertiary relief angle α3 that is greater than the secondary relief angle α2; (vi) the first protrusion 122, 222 formed between the secondary clearance surface 118, 218 and the tertiary clearance surface 120, 220 and having the first curvilinear shape; (vii) the gullet surface 130, 230 formed on an opposite side of the rake face 114, 214 relative to the tip 112, 212; and (viii) the second protrusion 132, 232 formed between the rake face 114, 214 and the gullet surface 130, 230 and having the second curvilinear shape. The difference between band saw blade D and band saw blade E is that band saw blade D has the 10-tooth ⅔ pitch pattern described above, while band saw blade E has the 13-tooth ¾ pitch pattern described above.

As illustrated in FIG. 6, the test data shows that band saw blade D provides a 7% greater blade life than saw blade B, a 32% greater life than saw blade C, and a 130% greater life than saw blade A. In this manner, band saw blade D having the above-described tooth form (which is the same for both band saw blade D and band saw blade E) achieves a dramatic increase in blade life as compared to the existing band saw blades A, B, and C. As shown, band saw blade E, advantageously provides a 15% greater life than saw blade D, a 24% greater blade life than saw blade B, a 53% greater life than saw blade C, and a 167% greater life than saw blade A. Notably, band saw blade E having the above-described tooth form and the 13-tooth ¾ pitch pattern achieves an even more dramatic and unexpected increase in blade life as compared to the existing band saw blades A, B, and C and band saw blade D, while also reducing the required cut force and increasing cutting speed. In this manner, although the above-described tooth form alone provides a significant increase in blade life, the test data appears to indicate that the features of the tooth form, 13-tooth ¾ pitch pattern, the multi-level set pattern, and the extra-wide kerf of the band saw blade 100 described above have a synergistic effect in enhancing the life of the saw blade 100, as these features cooperate with one another to provide improved performance in cutting large structural workpieces.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A band saw blade comprising:
a blade body comprising a cutting edge defined by a plurality of teeth spaced relative to each other, each tooth comprising:
a tip;
a rake face formed on one side of the tip;
a primary clearance surface formed on an opposite side of the tip relative to the rake face and defining a primary relief angle;
a secondary clearance surface formed on an opposite side of the primary clearance surface relative to the tip and defining a secondary relief angle that is greater than the primary relief angle;
a tertiary clearance surface formed on an opposite side of the secondary clearance surface relative to the primary clearance surface and defining a tertiary relief angle that is greater than the secondary relief angle; and
a protrusion formed between the secondary clearance surface and the tertiary clearance surface and having a curvilinear shape, wherein the protrusion is defined by a concave surface and a convex surface, wherein the concave surface extends from the secondary clearance surface to the convex surface, and wherein the convex surface extends from the concave surface to the tertiary clearance surface.

2. The band saw blade of claim 1, wherein the concave surface has a first radius, and wherein the convex surface has a second radius greater than the first radius.

3. The band saw blade of claim 2, wherein the first radius is within a range of between approximately 0.125 inches to approximately 0.175 inches, and wherein the second radius is within a range of between approximately 0.075 inches to approximately 0.125 inches.

4. A band saw blade comprising:
a blade body comprising a cutting edge defined by a plurality of teeth spaced relative to each other, each tooth comprising:
a tip;
a rake face formed on one side of the tip;
a primary clearance surface formed on an opposite side of the tip relative to the rake face and defining a primary relief angle;
a secondary clearance surface formed on an opposite side of the primary clearance surface relative to the tip and defining a secondary relief angle that is greater than the primary relief angle;
a tertiary clearance surface formed on an opposite side of the secondary clearance surface relative to the primary clearance surface and defining a tertiary relief angle that is greater than the secondary relief angle;
a gullet surface formed on an opposite side of the rake face relative to the tip; and
a protrusion formed between the rake face and the gullet surface and having a curvilinear shape, wherein the protrusion is defined by a concave surface and a convex surface, wherein the concave surface extends from the rake face to the convex surface, wherein the convex surface extends from the concave surface to the gullet surface, wherein the concave surface has a first radius, and wherein the convex surface has a second radius approximately equal to the first radius.

5. The band saw blade of claim 4, wherein the first radius and the second radius are within a range of between approximately 0.040 inches to approximately 0.080 inches.

6. A band saw blade comprising:
a blade body comprising a cutting edge defined by a plurality of teeth spaced relative to each other, each tooth comprising:
a tip;
a rake face formed on one side of the tip;
a primary clearance surface formed on an opposite side of the tip relative to the rake face and defining a primary relief angle;
a secondary clearance surface formed on an opposite side of the primary clearance surface relative to the tip and defining a secondary relief angle that is greater than the primary relief angle;
a tertiary clearance surface formed on an opposite side of the secondary clearance surface relative to the primary clearance surface and defining a tertiary relief angle that is greater than the secondary relief angle;
a first protrusion formed between the secondary clearance surface and the tertiary clearance surface and having a first curvilinear shape;
a gullet surface formed on an opposite side of the rake face relative to the tip; and
a second protrusion formed between the rake face and the gullet surface and having a second curvilinear shape;
wherein the plurality of teeth are spaced at varying pitch distances between adjacent teeth such that a difference between a minimum teeth per inch (TPI) based on a maximum pitch distance between a first pair of adjacent teeth and a maximum TPI based on a minimum pitch distance between a second pair of adjacent teeth is equal to or greater than 1;
wherein the plurality of teeth define a set pattern comprising, with respect to a cutting direction of the band saw blade:
a first unset tooth;
a first pair of consecutive light set teeth formed adjacent the first unset tooth in a direction opposite the cutting direction and set to opposite sides of the blade body from one another to a light set magnitude; and
a first pair of consecutive heavy set teeth formed adjacent the first pair of consecutive light set teeth in the direction opposite the cutting direction and set to opposite sides of the blade body from one another to a heavy set magnitude that is greater than the light set magnitude; and
wherein the plurality of teeth define a kerf width that is within a range of between approximately 0.115 inches to approximately 0.140 inches.

7. The band saw blade of claim 6, wherein the primary relief angle is within a range of between approximately 18 degrees to approximately 22 degrees.

8. The band saw blade of claim 7, wherein the secondary relief angle is within a range of between approximately 30 degrees to approximately 35 degrees.

9. The band saw blade of claim 8, wherein the tertiary relief angle is within a range of between approximately 40 degrees to approximately 55 degrees.

10. The band saw blade of claim 6, wherein the primary clearance surface has a first length in the cutting direction, wherein the secondary clearance surface has a second length in the cutting direction, and wherein the second length is greater than the first length.

11. The band saw blade of claim 6, wherein each tooth comprises a tip portion formed of a first metal, a base portion formed of a second metal different than the first metal, and a weld zone extending in the cutting direction along an interface of the tip portion and the base portion, wherein the first protrusion extends over a first end of the weld zone, and wherein the second protrusion extends over an opposite second end of the weld zone.

12. The band saw blade of claim 6, wherein the first protrusion is defined by a concave surface and a convex surface, wherein the concave surface extends from the secondary clearance surface to the convex surface, wherein the convex surface extends from the concave surface to the tertiary clearance surface, wherein the concave surface has a first radius, and wherein the convex surface has a second radius different than the first radius.

13. The band saw blade of claim 6, wherein the second protrusion is defined by a concave surface and a convex surface, wherein the concave surface extends from the rake face to the convex surface, wherein the convex surface extends from the concave surface to the gullet surface, wherein the concave surface has a first radius, and wherein the convex surface has a second radius approximately equal to the first radius.

14. The band saw blade of claim 6, wherein the plurality of teeth comprise a 13-tooth pitch pattern.

15. The band saw blade of claim 6, wherein the plurality of teeth comprise a 10-tooth pitch pattern.

16. The band saw blade of claim 6, wherein the difference between the minimum TPI and the maximum TPI is equal to or greater than 2.

17. The band saw blade of claim 6, wherein the minimum TPI is 2, and wherein the maximum TPI is 4.

18. The band saw blade of claim 6, wherein the minimum TPI is 3, and wherein the maximum TPI is 4.

19. The band saw blade of claim 6, wherein the first pair of consecutive light set teeth comprises a first light set tooth offset to a right side of the blade body and a second light set tooth formed adjacent the first light set tooth in the direction opposite the cutting direction and offset to a left side of the blade body, and wherein the first pair of consecutive heavy set teeth comprises a first heavy set tooth offset to the right side of the blade body and a second heavy set tooth formed adjacent the first heavy set tooth in the direction opposite the cutting direction and offset to the left side of the blade body.

20. The band saw blade of claim 6, wherein the set pattern further comprises:
  a second unset tooth formed adjacent the first pair of consecutive heavy set teeth in the direction opposite the cutting direction;
  a second pair of consecutive heavy set teeth formed adjacent the second unset tooth in the direction opposite the cutting direction and set to opposite sides of the blade body from one another to the heavy set magnitude;
  a third unset tooth formed adjacent the second pair of consecutive heavy set teeth in the direction opposite the cutting direction;
  a second pair of consecutive light set teeth formed adjacent the third unset tooth in the direction opposite the cutting direction and set to opposite sides of the blade body from one another to the light set magnitude; and
  a third pair of consecutive heavy set teeth formed adjacent the second pair of consecutive light set teeth in the direction opposite the cutting direction and set to opposite sides of the blade body from one another to the heavy set magnitude.

* * * * *